United States Patent
Tsuji et al.

(10) Patent No.: US 6,992,138 B2
(45) Date of Patent: Jan. 31, 2006

(54) POLYURETHANE POLYMER

(75) Inventors: Ryotaro Tsuji, Settsu (JP); Tomoki Hiiro, Settsu (JP)

(73) Assignee: Kaneka Corporation, Osaka (JP)

( * ) Notice: Subject to any disclaimer, the term of this patent is extended or adjusted under 35 U.S.C. 154(b) by 69 days.

(21) Appl. No.: 10/478,315

(22) PCT Filed: May 14, 2002

(86) PCT No.: PCT/JP02/04670

§ 371 (c)(1),
(2), (4) Date: Nov. 20, 2003

(87) PCT Pub. No.: WO02/098944

PCT Pub. Date: Dec. 12, 2002

(65) Prior Publication Data
US 2004/0171765 A1  Sep. 2, 2004

(30) Foreign Application Priority Data
May 31, 2001 (JP) ............................ 2001-165720
Jun. 7, 2001 (JP) ............................ 2001-172574

(51) Int. Cl.
 C08G 18/62 (2006.01)
 C08F 2/38 (2006.01)
 C08L 74/04 (2006.01)

(52) U.S. Cl. ...................... 525/131; 525/123; 526/222; 526/224; 528/75

(58) Field of Classification Search ................ 525/123, 525/131; 526/222, 224; 528/75
See application file for complete search history.

(56) References Cited

U.S. PATENT DOCUMENTS 4,152,309 A * 5/1979 Ijichi et al. .................. 524/145
5,319,024 A   6/1994 Ishidoya et al.
5,990,245 A * 11/1999 Esselborn et al. ........ 525/330.6

FOREIGN PATENT DOCUMENTS

| | | |
|---|---|---|
| JP | 4-227763 | 8/1992 |
| JP | 11-322884 | 11/1999 |
| WO | WO 98/01478 | 1/1998 |

* cited by examiner

Primary Examiner—David J. Buttner
(74) Attorney, Agent, or Firm—Kenyon & Kenyon

(57) ABSTRACT

Provided is a polyurethane polymer which is excellent in oil resistance, weatherability, light resistance, heat resistance, hot water resistance, hydrolysis resistance, strength, chlorine resistance, and chemical resistance, and which can be produced simply and economically. The polyurethane polymer is produced by polymerizing at least two components: a vinyl polymer (A) having a mercapto group at each end of the molecular chain produced by a reversible addition-fragmentation chain transfer polymerization method, and an organic polyisocyanate (B). Also provided are polyurethane-based materials containing the polyurethane polymer, and polyurethane elastic fiber.

17 Claims, No Drawings

POLYURETHANE POLYMER

RELATED APPLICATIONS

This is a 371 application of PCT/JP02/04670 filed on 14 May 2002, claiming priority to Japanese Application No. 2001-165720 filed on 31 May 2001, and Japanese Application No. 2001-172574 filed 7 Jun. 2001, the entire contents of which are incorporated herein by reference.

TECHNICAL FIELD

The present invention relates to polyurethane polymers. More particularly, the invention relates to a polyurethane polymer which is excellent in oil resistance, weatherability, light resistance, heat resistance, hot water resistance, hydrolysis resistance, strength, chlorine resistance, and chemical resistance; a polyurethane-based material containing the polyurethane polymer; and polyurethane elastic fibers.

BACKGROUND ART

Polyurethane materials are synthesized by reacting polyisocyanates with polyols. In general, examples of polyols used include polyether polyols such as poly(ethylene oxide) and poly(propylene oxide), modified polyether polyols, polytetramethylene glycol, condensation polyester polyols produced by reacting dicarboxylic acids with diols, lactone-type polyester polyols produced by ring opening polymerization of ε-caprolactone or the like, and polycarbonate polyols. Polyurethane materials synthesized using these polyols exhibit insufficient weatherability, light resistance, heat resistance, hot water resistance, and hydrolysis resistance because they contain many heteroatoms in the main chains. In particular, in applications in which the polyurethane materials are in contact with water for a long period of time, since the polyurethane materials are easily hydrolyzed, insufficient durability gives rise to problems.

In order to overcome such problems, as polyol materials, vinyl polymers into which hydroxyl groups are introduced have been invented. Examples thereof include a polyol having polyisobutylene as the main chain (Japanese Unexamined Patent Application Publication No. 11-131325); a process for polymerizing styrene or butadiene using an initiator having hydroxyl groups (J. Polym. Sci., Part A1, 1971, Vol. 9, page 2029); a polymerization process in which hydroxyl group-containing dithiocarbamate or hydroxyl group-containing thiuram disulfide is used as an initiator or a chain transfer agent (Japanese Unexamined Patent Application Publication No. 61-271306); a polymerization process in which a disulfide having hydroxyl groups at both ends, a trisulfide having a hydroxyl group at each end, or the like, is used as a chain transfer agent (Japanese Unexamined Patent Application Publication No. 54-47782); processes for radically polymerizing vinyl monomers using polysulfide compounds having hydroxyl groups at both ends as chain transfer agents (Japanese Patent No. 2594402, Japanese Unexamined Patent Application Publication No. 6-211922, and Japanese Unexamined Patent Application Publication No. 5-262808); and a process in which a vinyl polymer having halogen atoms at both ends is produced by atom transfer radical polymerization using a metal complex as a catalyst, and the halogen atoms are converted into hydroxyl groups (Japanese Unexamined Patent Application Publication No. 2000-53723). Although the polyurethane polymers using these polyols have overcome some of the problems described above, a polyurethane polymer which is satisfactory in every aspect, e.g., physical properties, the range of usable monomers, ease of production, and cost, has not been produced yet.

Polyurethane elastic fibers are usually produced by wet spinning, dry spinning, melt spinning, or the like, and polymers constituting these fibers are linear block copolymers including hard segments which have high melting points and soft segments which have glass transition temperatures below room temperature and which are highly flexible. Since the soft segments are usually composed of polyether polyols, polyester polyols, polycarbonate polyols, or the like, the problems described above, in particular, poor light resistance and chlorine resistance, arise. With respect to light resistance, examples of problems include yellowing due to light, and loss of contraction and expansion properties and stretch and recovery properties. With respect to chlorine resistance, examples of problems include loss of contraction and expansion properties of clothing for swimming, such as swimwear, due to the use of chlorine as a bactericide at swimming pools; embrittlement of clothing, such as underwear, due to chlorine bleaches during washing; and embrittlement of clothing, such as swimwear and underwear, due to the presence of chlorine in tap water.

In order to improve chlorine resistance, some methods have been suggested, e.g., a method in which magnesium oxide or aluminum oxide is incorporated into polyurethane constituting fibers (Japanese Examined Patent Application Publication No. 61-35283), and a method in which zinc oxide is incorporated (Japanese Examined Patent Application Publication No. 60-43444). However, due to unsatisfactory solubility or dispersibility of these metal oxides in spinning solutions, uniformity is not achieved. Consequently, the resultant elastic fibers may become mottled, the metal oxides may adhere to spinnerets, and end breakage may easily occur, resulting in a decrease in productivity. Moreover, in the dyeing step, the metal oxides may be removed, and thereby satisfactory chlorine resistance is not exhibited.

In order to improve light resistance, some methods are known in which ultraviolet absorbers (such as benzotriazole-based, benzophenone-based, and salicylic acid-based ultraviolet absorbers) are added to polyurethane constituting fibers. However, in such methods, as in the chlorine resistance-improving methods described above, these ultraviolet absorbers have low solubility in spinning solutions and easily adhere to spinnerets, and end breakage easily occurs. Furthermore, the ultraviolet absorbers are expensive, thus being uneconomical.

On the other hand, polyurethane elastic fibers using polyester polyols or polycarbonate polyols can be produced by melt spinning. However, because of the presence of ester bonds in the main chains, they have insufficient hot water resistance, alkali resistance, and mildew resistance.

In order to overcome the problems described above, some methods have been suggested, e.g., the process in which polyisobutylene is used as the polyol for soft segments in polyurethane elastic fibers (Japanese Unexamined Patent Application Publication No. 11-131325) and a process in which a vinyl polymer synthesized by atom transfer radical polymerization is used (Japanese Unexamined Patent Application Publication No. 2000-72841). However, when polyisobutylene is used as a polyol, the strength is low because no hydrogen bonds are present in the polyol portion. When a vinyl polymer synthesized by atom transfer radical polymerization is used, complicated purification steps are required because a metal complex is used as a catalyst, resulting in an increase in production cost and a decrease in productivity.

DISCLOSURE OF INVENTION

The present invention has been achieved to overcome the problems associated with the conventional techniques. It is an object of the present invention to provide a polyurethane polymer which is excellent in oil resistance, weatherability, light resistance, heat resistance, hot water resistance, hydrolysis resistance, strength, chlorine resistance, and chemical resistance, and which can be produced simply and economically; a polyurethane-based material containing the polyurethane polymer; and polyurethane elastic fibers.

In order to overcome the problems described above, the present inventors have conducted intensive research on polyurethane polymers, and have achieved the present invention by using a mercapto group-containing vinyl polymer instead of a polyol.

That is, a polyurethane polymer of the present invention is produced by polymerizing at least two components: a vinyl polymer (A) having a mercapto group at each end of the molecular chain, the vinyl polymer being prepared by reversible addition-fragmentation chain transfer polymerization, and an organic polyisocyanate (B).

The component (A), the vinyl polymer having a mercapto group at each end of the molecular chain, is prepared by a reversible addition-fragmentation chain transfer (RAFT) polymerization method in view of the fact that the vinyl polymer can be produced easily and economically and that mercapto groups are reliably introduced. RAFT polymerization methods are disclosed, for example, in PCT Publication No. WO98/01478; PCT Publication No. WO99/05099; PCT Publication No. WO99/31144; Macromolecules, 1998, 31, page 5559; Macromolecules, 1999, 32, page 2071; Macromolecules, 1999, 32, page 6977; and Macromolecules, 2000, 33, page 243. That is, the component (A) of the present invention is prepared by a process in which a radically polymerizable vinyl monomer is polymerized by the RAFT polymerization method in the presence of a thiocarbonylthio group-containing compound to produce a thiocarbonylthio group-containing polymer, and the thiocarbonylthio group of the resultant polymer is then converted into the mercapto group.

The thiocarbonylthio group-containing compound preferably used in the preparation of the mercapto group-containing vinyl polymer (A) used in the production of the polyurethane polymer of the present invention is represented by general formula (1):

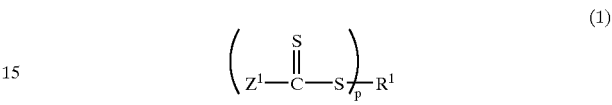

(wherein $R^1$ is a p-valent organic group of 1 or more carbon atoms which may contain one of nitrogen, oxygen, sulfur, halogen, silicon, phosphorus, and metal atoms, or which may be a polymer; each $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; plural $Z^1$s may be the same or different; and p is an integer of 2 or more).

In the structure of the thiocarbonylthio group-containing compound, $R^1$ is not particularly limited. In view of availability of the compound, preferably, $R^1$ has 1 to 20 carbon atoms, and p is 6 or less. Examples of $R^1$ include a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound, preferably, $R^1$ is any one of the groups represented by general formulae below:

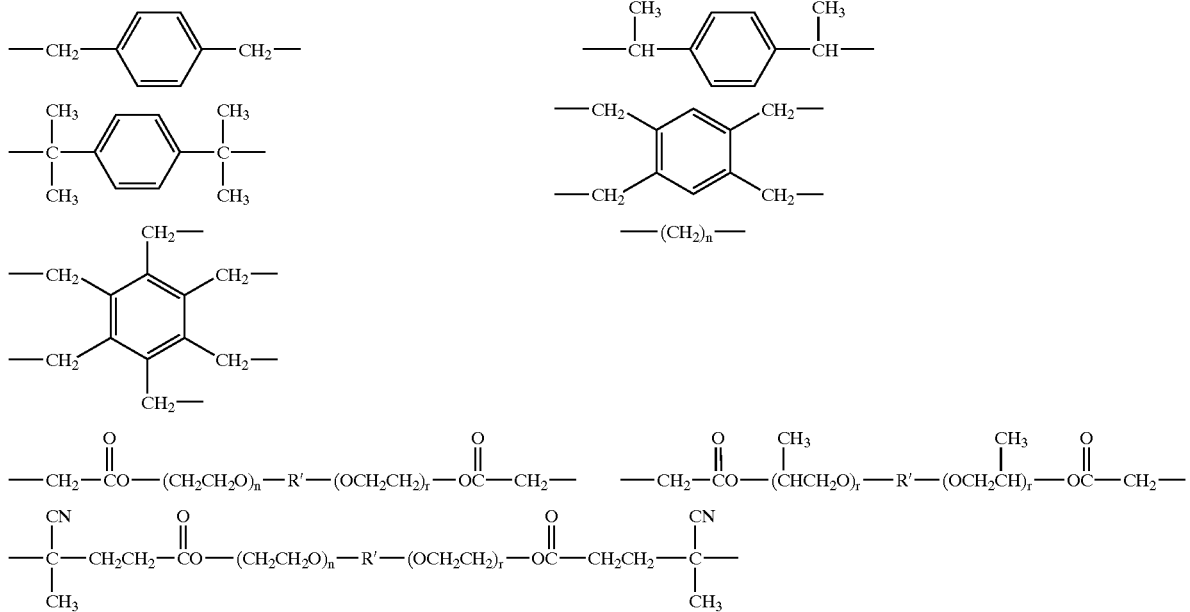

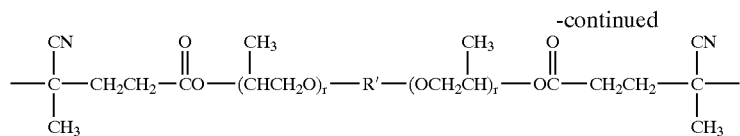

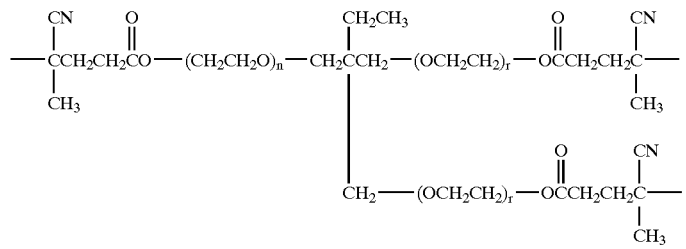

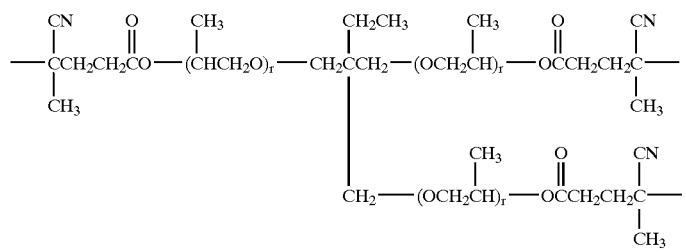

(wherein R' is a divalent organic group of 1 or more carbon atoms; n is an integer of 1 or more; r is an integer of 0 or more; and plural r's may be the same or different). In view of availability of the compound, preferably, R' has 1 to 20 carbon atoms. In the above formulae, examples of R' structures include, but are not limited to, divalent aliphatic hydrocarbon groups, divalent aromatic hydrocarbon groups, and divalent aromatic substituted aliphatic hydrocarbon groups, e.g., —(CH$_2$)$_n$— (wherein n is an integer of 1 or more), —C$_6$H$_4$—, and —CH$_2$—C$_6$H$_4$—CH$_2$—. Preferably, each of r and n is 500 or less.

Furthermore, as described above, R$^1$ may be a polymer. Examples thereof include a hydrocarbon group having a poly(ethylene oxide) structure, a hydrocarbon group having a poly(propylene oxide) structure, a hydrocarbon group having a poly(tetramethylene oxide) structure, a hydrocarbon group having a poly(ethylene terephthalate) structure, a hydrocarbon group having a poly(butylene terephthalate) structure, a hydrocarbon group having a polydimethylsiloxane structure, a hydrocarbon group having a polycarbonate structure, a hydrocarbon group having a polyethylene structure, a hydrocarbon group having a polypropylene structure, and a hydrocarbon group having a polyacrylonitrile structure. These hydrocarbon groups may contain one of oxygen, nitrogen, and sulfur atoms, and may contain a cyano group, an alkoxy group, or the like. The molecular weight thereof is usually 500 or more. Hereinafter, any one of the groups described above is referred to as the polymeric group of the present invention.

In the structure of the thiocarbonylthio group-containing compound, Z$^1$ is not particularly limited. When Z$^1$ is an organic group, preferably, the organic group has 1 to 20 carbon atoms in view of availability of the compound. Examples of Z$^1$ include alkyl, substituted alkyl, alkoxy, aryloxy, aryl, substituted aryl, aralkyl, substituted aralkyl, N-aryl-N-alkylamino, N,N-diarylamino, N,N-dialkylamino, thioalkyl, and dialkylphosphinyl. In view of availability of the compound and polymerization activity, Z$^1$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, methylthio, phenoxy, phenylthio, N,N-dimethylamino, N,N-diethylamino, N-phenyl-N-methylamino, N-phenyl-N-ethylamino, benzylthio, pentafluorophenoxy, or any one of the organic groups represented by general formulae below.

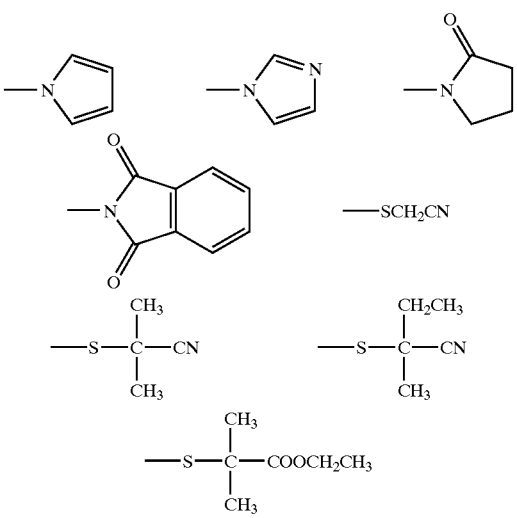

In view of availability and polymerization activity, preferred examples of thiocarbonylthio group-containing compounds used in the present invention include compounds represented by following formulae:
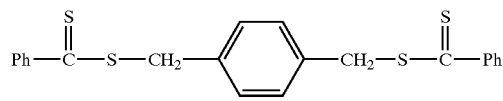
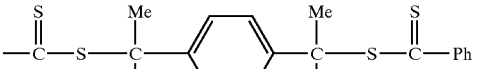
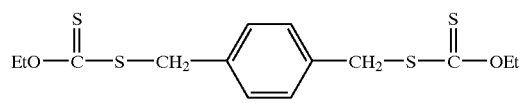
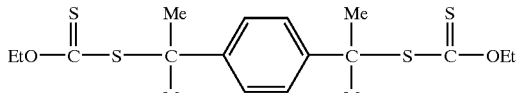
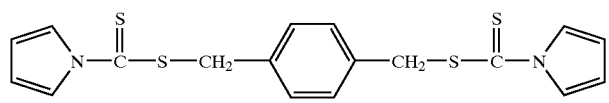
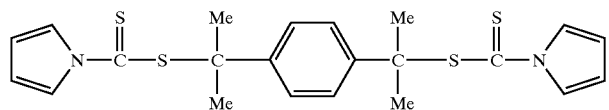
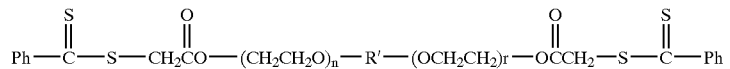
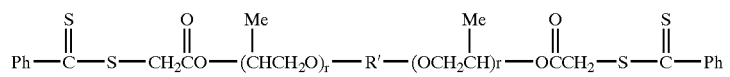
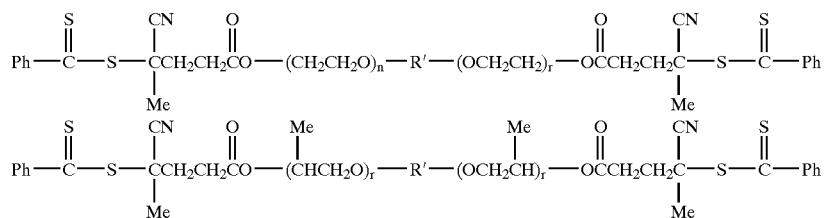
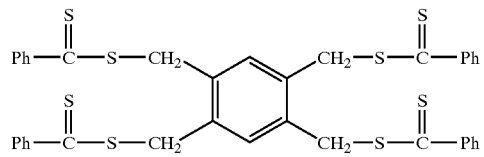
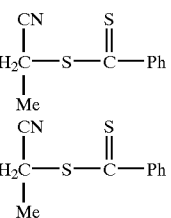
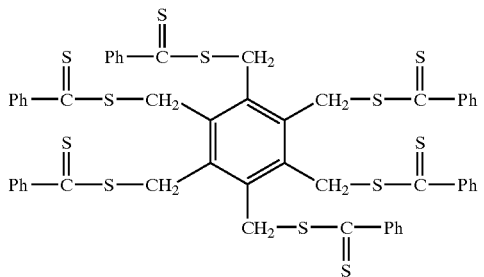
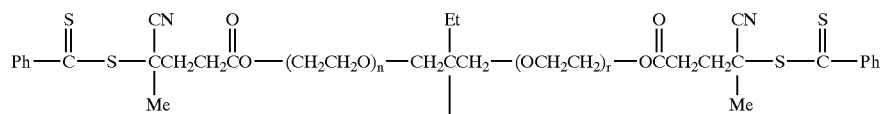
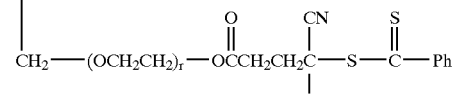
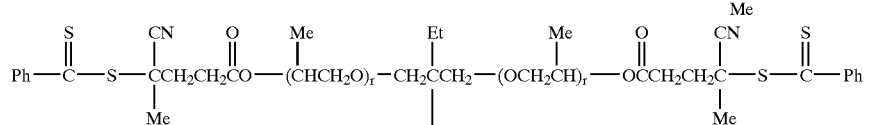
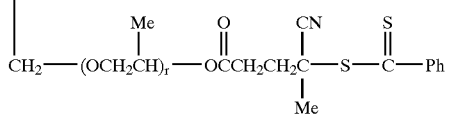

(wherein Me, Et, and Ph represent methyl, ethyl, and phenyl, respectively; R' is a divalent organic group of 1 or more carbon atoms; n is an integer of 1 or more; r is an integer of 0 or more; and plural r's may be the same or different). In view of availability of the compound, preferably, R' has 1 to 20 carbon atoms. In the above formulae, examples of R' structures include, but are not limited to, divalent aliphatic hydrocarbon groups, divalent aromatic hydrocarbon groups, and divalent aromatic substituted aliphatic hydrocarbon groups, e.g., —(CH$_2$)$_n$— (wherein n is an integer of 1 or more), —C$_6$H$_4$—, and —CH$_2$—C$_6$H$_4$—CH$_2$—. Preferably, each of r and n is 500 or less.

Among the thiocarbonylthio group-containing compounds described above, in view of the fact that a linear vinyl polymer having mercapto groups at both ends can be produced, preferred is a compound having two thiocarbonylthio groups in each molecule, (which corresponds to a compound represented by general formula (1) wherein p=2), represented by general formula (2):

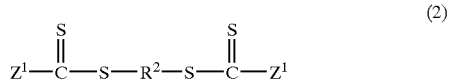
(2)

(wherein $R^2$ is a divalent organic group which may contain one of nitrogen, oxygen, sulfur, halogen, silicon, phosphorus, and metal atoms, or which may be a polymer; each $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; and two $Z^1$s may be the same or different).

In the structure of the compound having two thiocarbonylthio groups in each molecule, $R^2$ is not particularly limited. In view of availability of the compound, preferably, $R^2$ has 1 to 20 carbon atoms. Examples thereof include a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound and polymerization activity, preferably, $R^2$ has any one of the structures represented by formulae below:

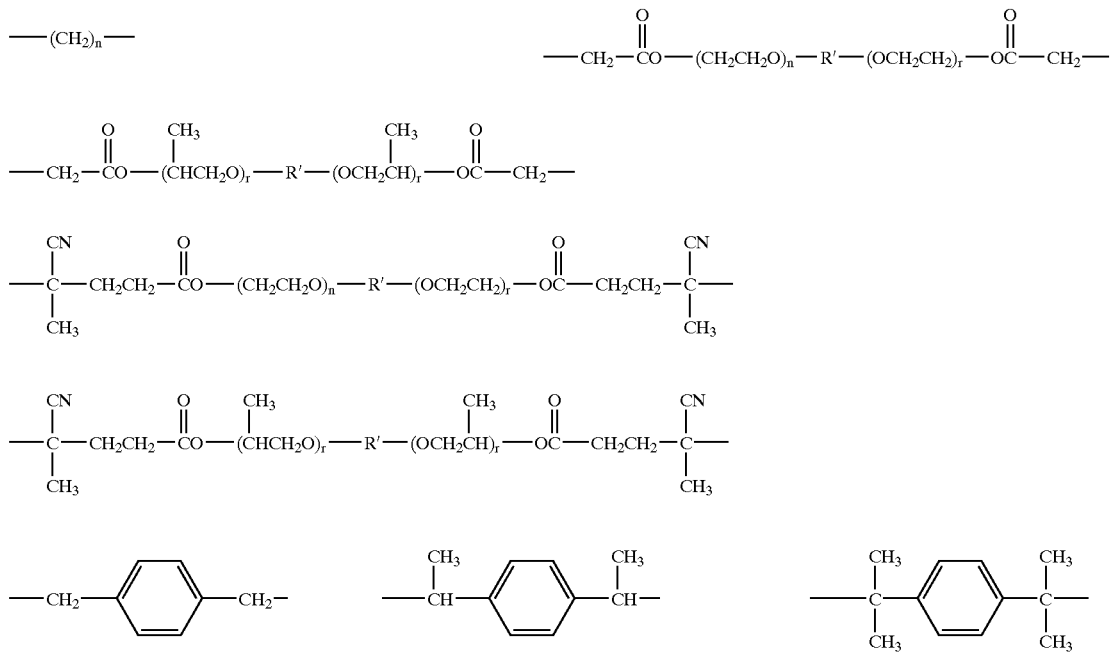

(wherein R' is a divalent organic group of 1 or more carbon atoms; n is an integer of 1 or more; r is an integer of 0 or more; and plural r's may be the same or different). In view of availability of the compound, preferably, R' has 1 to 20 carbon atoms. In the above formulae, examples of R' structures include, but are not limited to, divalent aliphatic hydrocarbon groups, divalent aromatic hydrocarbon groups, and divalent aromatic substituted aliphatic hydrocarbon groups, e.g., —(CH$_2$)$_n$— (wherein n is an integer of 1 or more), —C$_6$H$_4$—, and —CH$_2$—C$_6$H$_4$—CH$_2$—. Preferably, each of r and n is 500 or less.

In the structure of the compound having two thiocarbonylthio groups in each molecule, $Z^1$ is not particularly limited, examples thereof are the same as those described with reference to general formula (1).

Specific examples of the compound having two thiocarbonylthio groups in each molecule are not particularly limited. In view of availability and polymerization activity, preferred examples include the structures represented by formulae below:

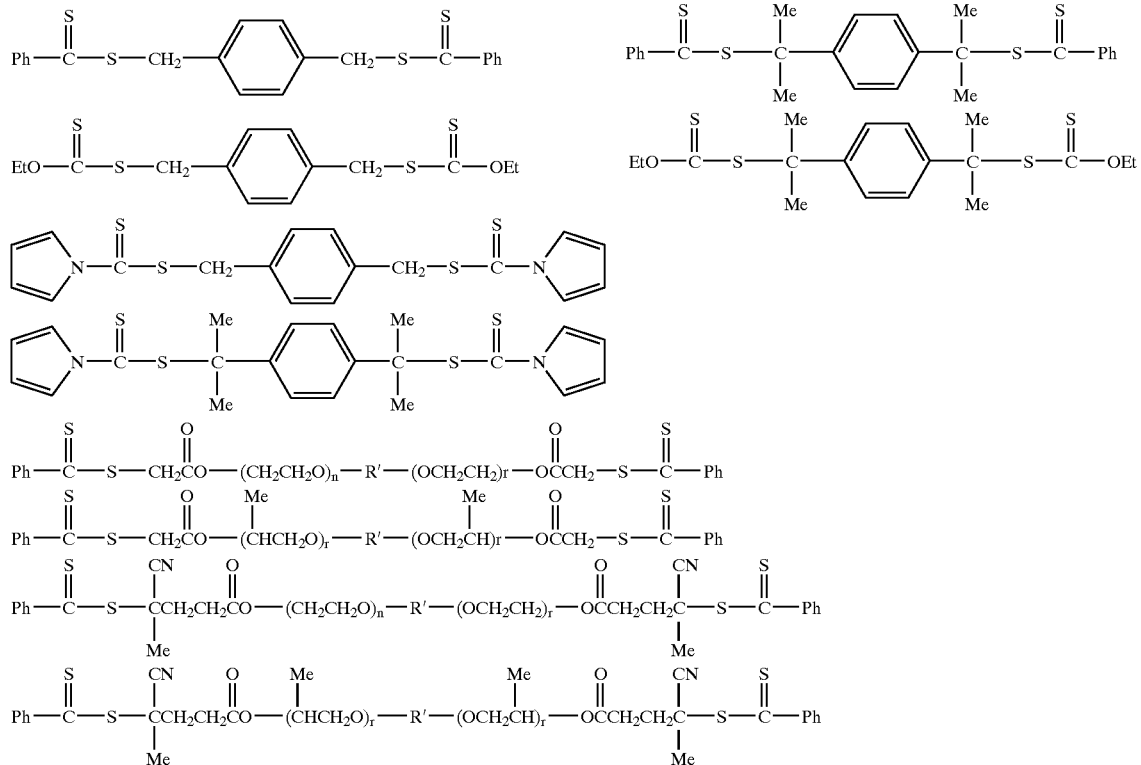

(wherein Me, Et, and Ph represent methyl, ethyl, and phenyl, respectively; R' is a divalent organic group of 1 or more carbon atoms; n is an integer of 1 or more; r is an integer of 0 or more; and plural r's may be the same or different). In view of availability of the compound, preferably, R' has 1 to 20 carbon atoms. In the above formulae, examples of R' structures include, but are not limited to, divalent aliphatic hydrocarbon groups, divalent aromatic hydrocarbon groups, and divalent aromatic substituted aliphatic hydrocarbon groups, e.g., —(CH$_2$)$_n$— (wherein n is an integer of 1 or more), —C$_6$H$_4$—, and —CH$_2$—C$_6$H$_4$—CH$_2$—. Preferably, each of r and n is 500 or less.

In the present invention, any radically polymerizable vinyl monomer may be used for producing the vinyl polymer, and vinyl monomers generally known in the art may be used. Examples of radically polymerizable vinyl monomers include, but are not limited to, methacrylate esters, such as methyl methacrylate, ethyl methacrylate, n-butyl methacrylate, isobutyl methacrylate, tert-butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, 2-methacryloyloxypropyltrimethoxysilane, 2-methacryloyloxypropyldimethoxymethylsilane, trifluoromethyl methacrylate, pentafluoroethyl methacrylate, and 2,2,2-trifluoroethyl methacrylate; acrylate esters, such as methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonandiol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, and allyl acrylate; aromatic alkenyl compounds, such as styrene, α-methylstyrene, p-methylstyrene, p-methoxystyrene, divinylbenzene, and vinylnaphthalene; vinyl cyanide compounds, such as acrylonitrile and methacrylonitrile; conjugated diene compounds, such as butadiene and isoprene; halogen-containing unsaturated compounds, such as vinyl chloride, vinylidene chloride, tetrafluoroethylene, hexafluoropropylene, vinylidene fluoride, vinyl bromide, and chloroprene; silicon-containing unsaturated compounds, such as vinyltrimethoxysilane, vinyltriethoxysilane, vinyltrimethylsilane, vinyltriphenylsilane, and vinyltriethylsilane; unsaturated dicarboxylic compounds, such as maleic anhydride, maleic acid, maleate monoesters, maleate diesters, fumaric acid, fumarate monoesters, and fumarate diesters; vinyl ester compounds, such as vinyl acetate, vinyl propionate, vinyl pivalate, vinyl benzoate, vinyl cinnamate, divinyl carbonate, vinylethyl carbonate, and vinylphenyl carbonate; allyl ester compounds, such as allyl acetate, allyl propionate, allyl pivalate, allyl benzoate, allyl cinnamate, diallyl carbonate, allylmethyl carbonate, and allylphenyl carbonate; unsaturated group-containing ether compounds, such as vinyl phenyl ether, vinyl ethyl ether, divinyl ether, trimethylolpropane monovinyl ether, trimethylolpropane divinyl ether, trimethylolpropane trivinyl ether, pentaerythritol monovinyl ether, pentaerythritol divinyl ether, pentaerythritol trivinyl ether, pentaerythritol tetravinyl ether, 1,4-butanediol monovinyl ether, 1,4-butanediol divinyl ether, ethylene glycol monovinyl ether, ethylene glycol divinyl ether, propylene glycol monovinyl ether, propylene glycol divinyl ether, polyethylene glycol monovinyl ether, polyethylene glycol divinyl ether, polypropylene glycol monovinyl ether, polypropylene glycol divinyl ether, vinyl glycidyl ether, allyl phenyl ether, allyl ethyl ether, diallyl ether, vinyl allyl ether, trimethylolpropane monoallyl ether, trimethylolpropane diallyl ether, trimethylolpropane triallyl ether, pentaerythritol monoallyl ether, pentaerythritol diallyl ether, pentaerythritol triallyl ether, pentaerythritol tetraallyl ether, 1,4-butanediol monoallyl ether, 1,4-butanediol diallyl ether, ethylene glycol monoallyl ether, ethylene glycol diallyl ether, propylene glycol monoallyl ether, propylene glycol diallyl ether, polyethylene glycol monoallyl ether, polyethylene glycol diallyl ether, polypropylene glycol monoallyl ether, polypropylene glycol diallyl ether, and allyl glycidyl ether; maleimide compounds, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylic acid and methacrylic acid; acrolein and methacrolein; cyclopolymerizable compounds, such as 1,6-heptadiene and diallylammonium salts; and N-vinyl pyrrolidone, N-vinyl carbazole, etc. These compounds may be used alone or in combination. When a copolymer is produced from a plurality of vinyl monomers, any form may be acceptable, such as a random copolymer, a block copolymer, a graft copolymer, or a combination of these.

Among the radically polymerizable vinyl monomers described above, in view of usefulness of the resultant polyurethane polymers, availability, and cost, preferred are styrene, α-methylstyrene, vinyl chloride, methacrylate esters, acrylate esters, acrylonitrile, and vinyl acetate. In view of the fact that the resultant polyurethane polymers are excellent in oil resistance, weatherability, light resistance, heat resistance, hot water resistance, hydrolysis resistance, strength, chlorine resistance, and chemical resistance, more preferred are methacrylate esters, acrylate esters, and acrylonitrile.

Among the radically polymerizable vinyl monomers described above, in view of the fact that flexible polyurethane elastic fibers are formed when the resultant polyurethane polymers are used as elastic fibers, preferred are vinyl monomers which can produce polymers with a glass transition temperature of 30° C. or less, more preferred are vinyl monomers which can produce polymers with a glass transition temperature of 15° C. or less, and most preferred are vinyl monomers which can produce polymers with a glass transition temperature of 0° C. or less.

In order to produce polyurethane elastic fibers which are excellent in weatherability, light resistance, heat resistance, hot water resistance, hydrolysis resistance, strength, and chlorine resistance, more preferably, 50% to 100% by weight of an acrylate ester monomer and 50% to 0% by weight of at least one monomer selected from the group consisting of styrene, α-methylstyrene, vinyl chloride, methacrylate esters, acrylonitrile, and vinyl acetate are used. Most preferably, 80% to 100% by weight of an acrylate ester monomer and 20% to 0% by weight of at least one monomer selected from the group consisting of methacrylate esters and acrylonitrile.

When the vinyl monomer is radically polymerized in order to prepare the vinyl polymer (A), any method commonly used in the art, such as bulk polymerization, solution polymerization, emulsion polymerization, suspension polymerization, or microsuspension polymerization, may be employed. In view of cost and safety, water-based polymerization, such as emulsion polymerization, suspension polymerization, or microsuspension polymerization, is preferred.

In the case of solution polymerization of the monomers, examples of solvents which may be used include, but are not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, dibutyl ether, dioxane, ethylene glycol dimethyl ether, and ethylene glycol diethyl ether; and aromatic petroleum solvents, such as toluene, xylene, benzene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of the solvent used may be determined in consideration of the solubility of the monomers, the solubility of the resultant polymer, the polymerization initiator concentration and the monomer concentration suitable for achieving a satisfactory reaction rate, the solubility of the thiocarbonylthio group-containing compound, effects on human body and environment, availability, cost, etc., and are not particularly limited. Above all, industrially, toluene is preferred in view of availability and cost.

In the case of emulsion polymerization or microsuspension polymerization of the monomers, examples of emulsifiers which may be used include, but are not limited to, anionic surfactants, such as fatty acid soap, rosin acid soap, sodium naphthalenesulfonate-formalin condensates, sodium alkylbenzene sulfonate, sodium alkylsulfate (e.g., sodium dodecylsulfate), ammonium alkylsulfate, triethanolamine alkylsulfate, sodium dialkylsulfosuccinate, sodium alkyldiphenyl ether disulfonate, sodium polyoxyethylene alkyl ether sulfate, and sodium polyoxyethylene alkylphenyl ether sulfate; nonionic surfactants, such as polyoxyethylene alkyl ether, polyoxyethylene higher alcohol ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene aklylamine, and alkyl alkanolamide; and cationic surfactants, such as alkyltrimethylammonium chloride. These emulsifiers may be used alone or in combination. As necessary, a cationic surfactant, such as an alkylamine hydrochloride, may be used, or a dispersant for suspension polymerization which will be described below may also be added. The amount of the emulsifier used is usually 0.1 to 20 parts by weight based on 100 parts by weight of the monomers used, but is not limited thereto.

In the case of suspension polymerization of the monomers, any dispersant commonly used in the art may be used. Examples of dispersants include, but are not limited to, partially saponified poly(vinyl acetate), poly(vinyl alcohol), methyl cellulose, carboxymethyl cellulose, gelatin, poly(alkylene oxide), and combinations of anionic surfactants and dispersing agents. These may be used alone or in combination. The emulsifier used for emulsion polymerization described above may also be used as necessary. The amount of the dispersant used is usually 0.1 to 20 parts by weight based on 100 parts by weight of the monomers used, but is not limited thereto.

The polymerization initiator or polymerization initiation methods used in the radical polymerization are not particularly limited, and any polymerization initiator or polymerization initiation method commonly used in the art may be used. Examples of polymerization initiators include, but are not limited to, peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, tert-butyl hydroperoxide, cumene hydroperoxide, diisopropylbenzene hydroperoxide, p-menthane hydroperoxide, 1,1,3,3-tetramethylbutyl hydroperoxide, di-tert-butyl peroxide, tert-butyl-α-cumyl peroxide, di-α-cumyl peroxide, 1,4-bis[(tert-butylperoxy)isopropyl]benzene, 1,3-bis[(tert-butylperoxy)isopropyl]benzene, 2,5-dimethyl-2,5-bis(tert-butylperoxy)hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzoylperoxy)hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl) peroxy dicarbonate, bis(2-ethoxyethyl)peroxy dicarbonate, bis(4-tert-butylcyclohexyl)peroxy dicarbonate, O-tert-butyl-O-isopropylperoxy carbonate, and succinic acid peroxide; azo polymerization initiators, such as 2,2'-azobis-(2-amidinopropane)dihydrochloride, dimethyl 2,2'-azobis(isobutyrate), 2,2'-azobis-(4-methoxy-2,4-dimethylvaleronitrile), 2,2'-azobis(isobutyronitrile), 1,1'-azobis(cyclohexane-1-carbonitrile), azocumene, 2,2'-azobis(2-methylbutyronitrile), 2,2'-azobis(2,4-dimethylvaleronitrile), 4,4'-azobis(4-cyanovaleric acid), 2-(tert-butylazo)-2-cyanopropane, 2,2'-azobis(2,4,4-trimethylpentane), and 2,2'-azobis(2-methylpropane); inorganic peroxides, such as potassium persulfate and sodium persulfate; vinyl monomers which thermally generate radical species, such as styrene; compounds which generate radical species by light, such as benzoin derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system by electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53–95 may be employed.

The amount of the polymerization initiator used is not particularly limited. In order to produce a polymer with a narrow molecular weight distribution, the amount of radical species generated during polymerization is preferably 1 mole or less, and more preferably 0.5 moles or less, relative to 1 mole of the thiocarbonylthio group of the thiocarbonylthio group-containing compound. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light, electron beams, or the like. Because of ease of control of polymerization, using a polymerization initiator which causes thermal dissociation, the polymerization reaction is carried out preferably at temperatures which allow the polymerization initiator to have a half-life of 0.5 to 50 hours, more preferably at temperatures which allow the polymerization initiator to have a half-life of 1 to 20 hours, and most preferably at temperatures which allow the polymerization initiator to have a half-life of 5 to 15 hours.

As described above, by radically polymerizing the vinyl monomer by a method commonly used in the art, such as bulk polymerization, solution polymerization, emulsion polymerization, suspension polymerization, or microsuspension polymerization, a thiocarbonylthio group-containing vinyl polymer is produced. When the polymerization is carried out, the monomer may be placed in a lump into a reactor or may be added into a reactor in sequence. The polymerization is carried out by selecting monomers appropriately depending on the purposes and by appropriately controlling the reactions, and thereby a desired thiocarbonylthio group-containing vinyl polymer is produced.

The thiocarbonylthio group-containing vinyl polymer is treated with a processing agent, and thereby the thiocarbonylthio groups are converted into mercapto groups. The processing agent used is not particularly limited. In view of high yield, preferably, at least one compound selected from the group consisting of bases, acids, ammonia, hydrazine, primary amine compounds, and secondary amine compounds is used. When a base or an acid is used, in the presence of water, thiocarbonylthio groups are converted into mercapto groups by hydrolysis. When ammonia, hydrazine, a primary amine compound, or a secondary amine compound is used, the presence of water is not required, which is preferable.

Examples of bases which may be used as processing agents include, but are not limited to, alkali metal hydroxides, such as sodium hydroxide, potassium hydroxide, and lithium hydroxide; alkaline-earth metal hydroxides, such as calcium hydroxide, magnesium hydroxide, barium hydroxide, and cesium hydroxide; transition metal hydroxides, such as aluminum hydroxide and zinc hydroxide; alkali metal alcoholates, such as sodium methylate, sodium ethylate, sodium phenylate, lithium ethylate, and lithium butylate; alkaline-earth metal alcoholates, such as magnesium methylate and magnesium ethylate; metal hydrides, such as sodium hydride, lithium hydride, calcium hydride, lithium aluminum hydride, and aluminum borohydride; and organometallic reagents, such as hydrosulfite, n-butyllithium, tert-butyllithium, ethylmagnesium bromide, and phenylmagnesium bromide. Furthermore, alkali metals, such as metallic lithium, metallic sodium, and metallic potassium; and alkaline-earth metals, such as metallic magnesium and metallic calcium may also be used. These bases may be used alone or in combination. Among them, in view of availability, cost, and reactivity, preferred are sodium hydroxide, potassium hydroxide, lithium hydroxide, calcium hydroxide, magnesium hydroxide, sodium methylate, sodium ethylate, sodium hydride, lithium hydride, metallic lithium, metallic sodium, and metallic potassium. Because of ease of handling, more preferred are sodium hydroxide, potassium hydroxide, lithium hydroxide, calcium hydroxide, magnesium hydroxide, sodium methylate, and sodium ethylate.

Examples of acids which may be used as processing agents include, but not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; organic acids, such as p-toluenesulfonic acid, trifluoromethyl sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid; and acid ion exchange resins, such as strong acid ion exchange resins and weak acid ion exchange resins. Furthermore, compounds which show acidity in reaction with a small amount of water may also be used. Examples of such compounds include acid anhydrides, such as acetic anhydride, propionic anhydride, trifluoroacetic anhydride, phthalic anhydride, and succinic anhydride; acyl halides; and metal halides, such as titanium tetrachloride, aluminum chloride, and silicon chloride. These acids may be used alone or in combination. Among them, in view of availability, cost, and reactivity, preferred are hydrochloric acid, nitric acid, sulfuric acid, phosphoric acid, aluminum chloride, titanium tetrachloride, chlorosulfonic acid, p-toluenesulfonic acid, trifluoromethyl sulfonic acid, acetic acid, and trifluoroacetic acid.

Among the processing agents described above, the primary amine compounds and the secondary amine compounds include primary and secondary amines and their analogues. The amine compounds of the present invention also include compounds, such as amides and imides, which are analogous to amines. Examples of such primary and secondary amine compounds include, but are not limited to, hydroxylamine sulfate, hydroxylamine, N-(2-aminoethyl) ethanolamine, N-methylethanolamine, 12-aminododecanoic acid, 3-amino-1-propanol, amine-modified acrylic polymers, allylamine, diallylamine, isopropylamine, diisopropylamine, 3,3'-iminobis(propylamine), ethylamine, diethylamine, 2-ethylhexylamine, 3-(2-ethylhexyloxy) propylamine, 3-ethoxypropylamine, diisobutylamine, 3-(diethylamino)propylamine, di-2-ethylhexylamine, 3-(dibutylamino)propylamine, tert-butylamine, sec-butylamine, n-butylamine, n-propylamine, 3-(methylamino)propylamine, 3-(dimethylamino)propylamine, N-methyl-3,3'-iminobis(propylamine), 3-methoxypropylamine, isopropanolamine, N-isopropylacrylamide, iminodiacetic acid, 3,3'-iminodipropionitrile, monoethanolamine, diethanolamine, N-ethylethylenediamine, ethyleneimine, ethylenediamine, diethylenetriamine, triethylenetetramine, tetraethylenepentamine, pentaethylenehexamine, N-carboxy-4,4'-methylenebiscyclohexylamine, carbohydrazides, guanidine hydrochloride, guanidine nitrate, guanidine carbonate, guanidine phosphate, guanidine sulfamate, aminoguanidine hydrochloride, aminoguanidine bicarbonate, guanylthiourea, guanylurea phosphate, guanylurea sulfate, glycylglycine, 2-chloroethylamine, 1,4-diaminobutane, 1,2-diaminopropane, 1,3-diaminopropane, diaminomaleonitrile, cyclohexylamine, cyclopentylamine, dicyandiamide, dicyclohexylamine, N-(3-(dimethylamino)propyl)acrylamide, N-(3-(dimethylamino)propyl)methacrylamide, dimethylamineborane, dimethylhydrazine, N,N'-ethylenebis(stearoamide), amide oleate, amide stearate, N,N'-methylenebis(stearoamide), methylol stearoamide, 3,9-bis(3-aminopropyl)-2,4,8,10-tetraoxaspiro[5,5]undecane, CTU guanamine, thiocarbohydrazide, thiosemicarbazide, thiourea, dihydrazide dodecanedioate, trans-1,2-cyclohexanediamine, dihydrazide adipate, dihydrazide sebacate, dihydrazide isophthalate, thiourea dioxide, 2-hydroxyethylaminopropylamine, isobutylamine, 2-bromoethylamine, hexamethylenediamine, 1,6-hexamethylenebis(N,N-dimethylsemicarbazide), n-hexylamine, polyethyleneimine, formamidine, formamidine acetate, formamide, methacrylamide, monomethylamine, dimethylamine, N,N'-methylenebis(acrylamide), N-methylolacrylamide, monomethylhydrazine, 3-(lauryloxy)propylamine, acetanilide, acetoacet-o-anisidide, acetoacetanilide, acetoacet-m-xylidide, acetoacet-o-chloroanilide, acetoacet-2,5,-dimethoxyanilide, acetoacet-2,5-dimethoxy-4-chloroanilide, acetoacet-o-toluidide, acetoacet-p-toluidide, o-anisidine, p-anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, o-aminophenol, m-aminophenol, p-aminophenol, p-aminobenzaldehyde, 4-aminobenzonitrile, anthranilic acid, 3-isopropoxyaniline, N-ethylaniline, N-ethylene toluene sulfonamide, 2,4-xylidine, 3,4-xylidine, m-xylylenediamine, p-cresidine, dianisidine, 4,4'-diaminostilbene-2,2'-disulfonic acid, 1,4-diaminoanthraquinone, 4,4'-diamino-3,3'-diethyldiphenylmethane, 4,4'-diaminobenzanilide, diaminodiphenyl ether, diaminonaphthalene, diaminoanthracene, diphenylamine, dibenzylamine, 3,3'-dimethyl-4,4'-diaminodiphenylmethane, sulfanilic acid, 1,1,1',1'-tetramethyl-4,4'-(methylenedi-p-phenylene)disemicarbazide, tobias acid, 2,4,5-trichloroaniline, o-tolidine, o-toluidine, m-toluidine, p-toluidine, m-toluylenediamine, sodium naphthionate, o-nitroaniline, m-nitroaniline, p-nitroaniline, o-nitro-p-chloroaniline, m-nitro-p-toluidine, o-chloro-p-toluidine-m-sulfonic acid, p-hydroxyphenylacetamide, 7-anilino-4-hydroxy-2-naphthalenesulfonic acid, phenylhydrazine, o-phenylenediamine, m-phenylenediamine, p-phenylenediamine, p-phenetidine, phenethylamine, benzylamine, benzophenone hydrazine, mesidine, metanilic acid, N-methylaniline, 2-methyl-4-nitroaniline, 2-methyl-4-methoxydiphenylamine, 2-amino-5-methylbenzenesulfonic acid, leuco-1,4-diaminoanthraquinone, paramine, p-hydroxyphenylglycine, acetaldehyde ammonia, acetoguanamine, 3-amino-1,2,4-triazole, 2-aminopyridine, 3-aminopyridine, 4-aminopyridine, 1-(2-aminoethyl)piperazine, N-(3-aminopropyl)morpholine, 1-amino-4-methylpiperazine, isocyanuric acid, imidazole, 2-methylimidazole, 2-ethyl-4-methylimidazole, 2-phenylimidazole, 2-undecylimidazole, 2-heptadecylimidazole, 2-phenyl-4-methylimidazole, 1-aminoethyl-2-methylimidazole, 1-(cyanoethylaminoethyl)-2-methylimidazole, N-(2-(2-methyl-1-imidazolyl)ethyl)urea, 2,4-diamino-6-(2-methyl-1-imidazolylethyl)-1, 3,5-triazine, 2,4-diamino-6-(2-undecyl-1-imidazolylethyl)-1,3,5-tiazine, 2,4-diamino-6-(2-ethyl-4-methyl-1-imidazolylethyl)-1,3,5-tiazine, 2-phenyl-4-methyl-5-hydroxymethylimidazole, 2-phenyl-4,5-bis(hydroxymethyl)imidazole, an adduct of 2-methylimidazole and isocyanuric acid, an adduct of 2-phenylimidazole and isocyanuric acid, an adduct of 2,4-diamino-6-(2-methyl-1-imidazolylethyl)-1, 3,5-triazine and isocyanuric acid, 2-methyl-4-formylimidazole, 2-phenyl-4-formylimidazole, 4-formylimidazole, 2,4-dimethyl-5-formylimidazole, 2,4-diphenyl-5-formylimidazole, 4-methylimidazole, 4-methyl-5-(hydroxymethyl)imidazole, 2-amino-4,5-dicyanoimdazole, imidazole-4,5-dicarboxylic acid, 3-carbamoyl-2-pyrazine carboxylic acid, imide succinate, quinaldine, 1,3-di(4-piperidyl)propane, 2-imidazolidinone, 5,5-dimethylhydantoin, 2,5-dimethylpiperazine, cis-2,6-dimethylpiperazine, 3,5-dimethylpyrazole, 2-methyl-4-pyrazolone, 5,5'-bi-1H-tetrazole, 5-phenyl-1H-tetrazole, 5-methyl-1H-tetrazole, 1,2,3,4-tetrahydroquinoline, bis(aminopropyl)piperazine, 1,3-bis(hydrazinocarboethyl)-5-isopropylhydantoin, hydantoin, (hydroxyethyl)piperazine, 2-pipecoline, 3-pipecoline, 4-pipecoline, 2-(1-piperazinyl)pyrimidine, piperazine, piperidine, pyrrolidine, pyrrole, phenylpyrazolidone, benzoguanamine, 2-methylpiperazine, 3-methyl-5-pyrazolone, 1-methylol-5,5-dimethylhydantoin, melamine, and morpholine. In addition, hindered amine light stabilizers (HALSs) may also be used. Examples of HALSs include bis(2,2,6,6-tetramethyl-4-piperidyl)sebacate, Sanol LS-770 (manufactured by Sankyo Co., Ltd.), Adekasutabu LA-77 (manufactured by Asahi Denka Co., Ltd.), Sumisorb 577 (manufactured by Sumitomo Chemical Co., Ltd.), Biosorb 04 (manufactured by Kyodo Chemical Co., Ltd.), Chimassorb 944LD (manufactured by Ciba Specialty Chemicals), Tinuvin 144 (manufactured by Ciba Specialty Chemicals), Adekasutabu LA-52 (manufactured by Asahi Denka Co., Ltd.), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-77 (manufactured by Asahi Denka Co., Ltd.), Adekasutabu LA-87 (manufactured by Asahi Denka Co., Ltd.), and Goodrite UV-3034 (manufactured by Goodrich Corporation).

The primary or secondary amine compounds described above may be used alone or in combination. When the thiocarbonylthio groups in the polymer are converted into mercapto groups, in view of the fact that the purification step can be simplified, preferred are ammonia; primary amines with a boiling point of 100° C. or less, such as methylamine and ethylamine; secondary amines with a boiling point of 100° C. or less, such as dimethylamine and diethylamine; and HALSs. When ammonia and amine compounds with a boiling point of 100° C. or less are used, excess amine compounds can be easily removed by distillation under reduced pressure. When HALSs are used, it is not necessary to remove excess HALSs because they function as stabilizers, and moreover, the resultant polymers have improved weatherability and light resistance. However, if a large amount of the amine compound remains in the polymer, it often reacts with and consumes the compound (B) having at least two isocyanato groups in each molecule, thus being uneconomical and resulting in a difficulty in controlling physical properties. Therefore, most preferred are ammonia, primary amines with a boiling point of 100° C. or less, and secondary amines with a boiling point of 100° C. or less in view of the fact that excess amine compound can be easily removed from the polymer.

In the reaction for converting thiocarbonylthio groups of the polymer into mercapto groups, the amount of the processing agent used is not particularly limited. In view of ease of handling and reactivity, the amount used is preferably 0.01 to 100 parts by weight, more preferably 0.05 to 50 parts by weight, and most preferably 0.1 to 30 parts by weight based on 100 parts by weight of the polymer. When ammonia, hydrazine, a primary amine compound, or a secondary amine compound is used in the conversion reaction, because of a high introduction rate of mercapto groups, the amount of the ammonia, hydrazine, or amine compound used is preferably 0.5 to 1,000 moles, and more preferably 1 to 500 moles, relative to 1 mole of the thiocarbonylthio group of the polymer.

In the present invention, when the thiocarbonylthio group-containing vinyl polymer is treated with the processing agent, the reaction conditions are not particularly limited. For example, the polymer may be dissolved in an organic solvent, and the processing agent may be added thereto. The processing agent may be added to a water-based dispersion or emulsion. Alternatively, the processing agent may be directly added to the solid or molten polymer itself. The treatment temperature is not particularly limited. In view of reactivity and stability of the polymer, the treatment temperature is preferably –50° C. to 300° C., and more preferably –10° C. to 200° C.

A vinyl polymer (A) having a mercapto group at each end of the molecular chain is thereby produced. Scheme 1 illustrates a reaction scheme in the case when a thiocarbonylthio group-containing compound represented by general formula (2) is used.

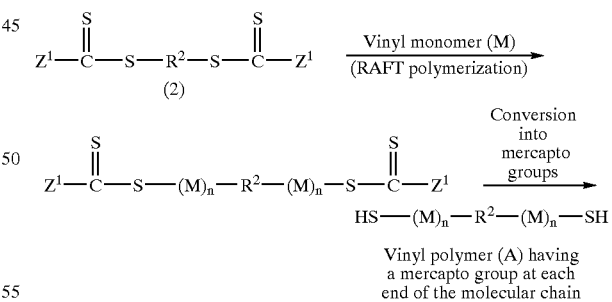

Scheme 1

Vinyl polymer (A) having a mercapto group at each end of the molecular chain

Small amounts of vinyl polymers having mercapto groups at some ends only (e.g. a vinyl polymer having a mercapto group at only one end of the linear molecule) are usually involved, which can be used as they are.

The structure of the mercapto group-containing vinyl polymer (A) is not particularly limited. For example, the vinyl polymer may be a linear polymer having mercapto groups at both ends or a star polymer having a mercapto group at each end of the molecular chain. The vinyl polymer (A) may be a homopolymer or a copolymer. When the vinyl polymer (A) is a copolymer, the structure of the copolymer is not limited, and examples thereof include a block copolymer, a random copolymer, and a graft copolymer.

The molecular weight of the vinyl polymer (A) having a mercapto group at each end of the molecular chain is not particularly limited and may be set depending on the application. In view of balance between workability and heat resistance, strength, or the like, the number-average molecular weight (Mn) determined by gel permeation chromatography (GPC) is preferably in the range of 2,500 to 1,000,000, and more preferably in the range of 5,000 to 500,000.

The molecular weight distribution of the mercapto group-containing vinyl polymer (A) is not particularly limited. Because of ease of control of physical properties in the production of the polyurethane polymer, the ratio (Mw/Mn; molecular weight distribution) of the weight-average molecular weight (Mw) to the number-average molecular weight (Mn) determined by gel permeation chromatography (GPC) is preferably 2 or less, more preferably 1.7 or less, and most preferably 1.5 or less.

The polyurethane polymer of the present invention includes the mercapto group-containing vinyl polymer (A), an organic polyisocyanate (B), and if necessary, a chain extender (C), as polymerization components.

As the organic polyisocyanate (B), any polyfunctional isocyanate compound that is known in the art may be used. Examples thereof include, but are not limited to, diisocyanate compounds, such as hexamethylene diisocyanate, 2,4-tolylene diisocyanate, 4,4'-diphenylmethane diisocyanate, isophorone diisocyanate, xylylene diisocyanate, tetramethylxylylene diisocyanate, hydrogenated tetramethylxylylene diisocyanate, methylenebis(cyclohexylisocyanate), bis(isocyanatemethyl)cyclohexane, 1,5-naphthylene diisocyanate, ethylene diisocyanate, methylene diisocyanate, propylene diisocyanate, and tetramethylene diisocyanate; triisocyanate compounds, such as 1,6,11-undecane triisocyanate and triphenylmethane triisocyanate; biuret polyisocyanates, such as Sumidur N (manufactured by Sumitomo Bayer Urethane Co., Ltd.); polyvalent isocyanate compounds formed by the reactions of these compounds with polyhydric alcohols; polyisocyanate compounds having isocyanurate rings, such as isocyanurate-modifications of these compounds, Desmodur IL (manufactured by Bayer A. G.), Desmodur HL (manufactured by Bayer A. G.), and Coronate EH (manufactured by Nippon Polyurethane Industry Co., Ltd.); and polyvalent isocyanate compounds formed by the reactions of these compounds with polyvalent amine compounds. These compounds may be used alone or in combination.

The organic polyisocyanate (B) may be selected depending on the physical properties required in the resultant polyurethane polymer and the characteristics required during polymerization reaction. For example, when weatherability is required, preferred are aliphatic polyvalent isocyanate compounds, such as hexamethylene diisocyanate, isophorone diisocyanate, methylenebis(cyclohexylisocyanate), and a polyisocyanate compound formed by the reaction of trimethylolpropane with hexamethylene diisocyanate. When large reaction rates are required in the polymerization of polyurethane polymers, preferred are aromatic polyvalent isocyanate compounds, such as 2,4-tolylene diisocyanate, 4,4'-diphenylmethane diisocyanate, 1,5-naphthylene diisocyanate, and triphenylmethane triisocyanate. Furthermore, when a polyurethane polymer is used as a thermoplastic elastomer, the compatibility between the polyurethane polymer and other resins and additives used can be adjusted by appropriately selecting the mercapto group-containing vinyl polymer (A) and the organic polyisocyanate (B).

When the mercapto group-containing vinyl polymer (A) and the organic polyisocyanate (B) are polymerized, it is not necessary to use a catalyst. In view of the fact that the heat resistance and weatherability of the resultant polyurethane polymer can be retained for a long period of time, preferably, no catalysts are used. However, in order to increase the reaction rate, a catalyst may be used. In such a case, a urethane formation catalyst commonly used in the art may be used. For example, the catalysts cited in Polyurethanes: Chemistry and Technology, Part I, Table 30, Chapter 4, Saunders and Frisch, Interscience Publishers, New York, 1963 may be used, but usable catalysts are not limited thereto. Preferred urethane formation catalysts are tin-based catalysts, tertiary amine compounds, and organometallic catalysts because of their high catalytic activity. Examples thereof include tin-based catalysts, such as tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate; tertiary amine compounds, such as triethylamine, N,N-dimethylcyclohexylamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, triethylenediamine, N,N'-dimethylpiperazine, N-methyl-N'-(2-dimethylamino)ethylpiperazine, N-methylmorpholine, N-(N',N'-dimethylaminoethyl)morpholine, 1,2-dimethylimidazole, dimethylaminoethanol, dimethylaminoethoxyethanol, N,N,N'-trimethylaminoethylethanolamine, N-methyl-N'-(2-hydroxyethyl)piperazine, N-(2-hydroxyethyl)morpholine, bis(2-dimethylaminoethyl) ether, and ethylene glycol bis(3-dimethyl)aminopropyl ether; and organometallic catalysts, such as phenylmercuric propionate and lead octenoate. These urethane formation catalysts may be used alone or in combination.

The isocyanato groups of the organic polyisocyanate (B) may be trimerized by forming isocyanurate rings, or the like. In such a case, another catalyst may be used. Examples thereof include metal oxides, such as lithium oxide and bis(tributyltin) oxide; metal hydrides, such as sodium borohydride; metal alkoxides, such as sodium methylate, potassium tert-butoxide, and borate salts; hydroxides, such as quaternary ammonium hydroxides; and tertiary amine compounds, such as triethylamine and dimethylpropylamine.

The amount of the urethane formation catalyst used is not particularly limited, but is preferably 0.0001 to 3 parts by weight, and more preferably 0.001 to 0.5 parts by weight, based on 100 parts by weight of the mercapto group-containing vinyl polymer. If the amount is less than 0.0001 parts by weight, a definite effect of the catalyst added is not obtained. If the amount exceeds 3 parts by weight, physical properties, such as heat resistance, weatherability, and hydrolysis resistance, of the resultant polyurethane polymer may be degraded.

As described above, the polyurethane polymer of the present invention may include, as necessary, a chain extender (C) as a polymerization component. The chain extender (C) is used to adjust the physical properties of the resultant polyurethane polymer, and the polyurethane polymer can be polymerized in the presence of the chain extender.

The chain extender (C) is a compound which has at least two active hydrogen groups that are reactable with isocyanato groups, in each molecule, and is favorably used particularly when the polyurethane polymer is used as elastic fibers. Examples of active hydrogen groups that are able to react with isocyanato groups include, but are not limited to, a hydroxyl group, a primary amino group, a secondary amino group, a mercapto group, a carboxyl group, and an amide group. For example, water also functions as a chain extender. In view of availability and reactivity, preferred examples of compounds used as chain extenders include compounds having at least two hydroxyl groups in each molecule, such as 3,6-dimethyl-4-octyne-3,6-diol, 2,4,7,9-tetramethyl-5-decyne-4,7-diol, 2,5-dimethyl-3-hexyne-2,5-diol, 2,5-dimethyl-2,5-hexanediol, isoprene glycol, diisopropanolamine, triisopropanolamine, diethanolamine, triethanolamine, ethylene glycol, diethylene glycol, triethylene glycol, 2-ethyl-1,3-hexanediol, sodium gluconate, glycerol α-monochlorohydrin, 1,4-cyclohexanediol, 1,3-dihydroxyacetone, 1,4-dihydroxy-1,4-butanedisulfonic acid disodium salt, tartaric acid, diisopropyl tartrate, 1-thioglycerol, thiodiglycol, trimethylolethane, trimethylolpropane, trimethylolpropane monoallyl ether, neopentyl glycol, 1,3-butanediol, 1,4-butanediol, 2-butyl-2-ethyl-1,3-propanediol, propylene glycol, dipropylene glycol, tripropylene glycol, 1,6-hexanediol, 1,2,6-hexanetriol, hexylene glycol, pentaerythritol, 1,5-pentanediol, polyethylene glycol, polytetramethylene ether glycol, polypropylene glycol, 3-methyl-1,5-pentanediol, catechol, 1,4-dihydroxyanthraquinone, 1,4-dihydroxynaphthalene, 2,3,4-trihydroxybenzophenone, 2,3,5-trimethylhydroquinone, hydroquinone, bis(2-hydroxyethyl)terephthalate, bis(4-hydroxyphenyl)sulfone, bisphenol A, p-hydroxyphenethyl alcohol, 4-tert-butylcatechol, 2-tert-butylhydroquinone, protocatechuic acid, phloroglucinol, lauryl gallate, resorcin, leuco-1,4-dihydroxyanthraquinone, 1,1'-bi-2-naphthol, kojic acid, N-methyldiethanolamine, and citrazinic acid; compounds having at least two primary amino groups or secondary amino groups in each molecule, such as hydrazine, 1,2-diaminoethane, 1,2-diaminopropane, 1,3-diaminopropane, 1,4-diaminobutane, 1,5-diaminopentane, 1,6-diaminohexane, 3,3'-dichloro-4,4'-diaminodiphenylmethane, dihydrazide adipate, N-(2-aminoethyl)ethanolamine, 3,3'-iminobis(propylamine), 3-(methylamino)propylamine, N-methyl-3,3'-iminobis(propylamine), N-ethylethylenediamine, diethylenetriamine, triethylenetetramine, tetraethylenepentamine, pentaethylenehexamine, N-carboxy-4,4'-methylenebiscyclohexylamine, carbodihydrazide, guanidine hydrochloride, guanidine nitrate, guanidine carbonate, guanidine phosphate, guanidine sulfamate, aminoguanidine hydrochloride, aminoguanidine sulfate, aminoguanidine bicarbonate, guanylthiourea, guanylurea phosphate, guanylurea sulfate, diaminomaleonirile, dicyandiamide, 3,9-bis(3-aminopropyl)-2,4,8,10-tetraoxaspiro[5,5]undecane, CTU guanamine, thiocarbohydrazide, thiosemicarbazide, thiourea, dihydrazide dodecanedioate, dihydrazide adipate, dihydrazide sebacate, dihydrazide isophthalate, thiourea dioxide, 1,6-hexamethylenebis(N,N-dimethylsemicarbazide), polyethyleneimine, formamidine, formamidine acetate, monomethylhydrazine, m-xylylenediamine, dianisidine, 4,4'-diaminostilbene-2,2'-disulfonic acid, 1,4-diaminoanthraquinone, 4,4'-diamino-3,3'-diethyldiphenylmethane, 4,4'-diaminobenzanilide, 4,4'-diaminodiphenyl ether, 3,3'-dimethyl-4,4'-diaminodiphenylmethane, 1,1,1',1'-tetramethyl-4,4'-(methylenedi-p-phenylene)disemicarbazide, o-tolidine, m-toluylenediamine, phenylhydrazine, o-phenylenediamine, m-phenylenediamine, p-phenylenediamine, leuco-1,4-diaminoanthraquinone, amidol, paramine, acetaldehyde ammonia, acetoguanamine, 3-amino-1,2,4-triazole, 1-(2-aminoethyl)piperazine, isocyanuric acid, 2,4-diamino-6-(2-methyl-1-imidazolyl)-ethyl-1,3,5-triazine, 2,4-diamino-6-(2-undecyl-1-imidazolylethyl)-1,3,5-tiazine, 2,4-diamino-6-(2-ethyl-4-methyl-1-imidazolylethyl)-1,3,5-tiazine, 1,3-di(4-piperidyl)propane, 5,5-dimethylhydantoin, 2,5-dimethylpiperazine, cis-2,6-dimethylpiperazine, 5,5'-bi-1H-tetrazole, bis(aminopropyl)piperazine, 1,3-bis(hydrazinocarboethyl)-5-isopropylhydantoin, hydantoin, piperazine, benzoguanamine, 2-methylpiperazine, melamine, guanazole sulfate, and 3,3'-dichloro-4,4'-diaminobiphenyl; compounds having a hydroxyl group and a primary amino group or secondary amino group in each molecule, such as N-methylethanolamine, 3-amino-1-propanol, monoisopropanolamine, monoethanolamine, 2-hydroxyethylaminopropylamine, 2-amino-4-chlorophenol, o-aminophenol, m-aminophenol, p-aminophenol, 2-amino-5-naphthol-7-sulfonic acid, 2-amino-5-naphthol, 7-anilino-4-hydroxy-2-naphthalenesulfonic acid, metol, p-hydroxyphenylglycine, paraaminophenol, Atomal, 2-phenyl-4-methyl-5-hydroxymethylimidazole, 2-phenyl-4,5-bis(hydroxymethyl)imidazole, (hydroxyethyl)piperazine, and 1-methylol-5,5-dimethylhydantoin; and water. These chain extenders may be used alone or in combination.

In the present invention, when a mercapto group-containing vinyl polymer (A), an organic polyisocyanate (B), and a chain extender (C) are used to prepare a polyurethane polymer, the amounts of the individual components used are not particularly limited. In view of the fact that sufficient strength, workability, and satisfactory surface properties are obtained, the following quantitative relationships are suitable. That is, the ratio of "number of moles of active hydrogen groups, such as mercapto groups, hydroxyl groups, and amino groups in mercapto group-containing vinyl polymer (A) and chain extender (C)" to "number of moles of isocyanato groups in the organic polyisocyanate (B)" is preferably 1:0.5 to 1:5, and more preferably, 1:0.8 to 1:2, and most preferably 1:0.95 to 1:1.5. When the amount of isocyanato groups is excessive, a further reaction can be carried out with moisture in air or the like after the reaction.

When the polyurethane polymer of the present invention is prepared, a polymeric polyol which is commonly used in the urethane industry may be used for the same purpose as that of the chain extender. Examples of polymeric polyols include, but are not limited to, polyether polyols, polyester polyols, acrylic polyols, phenolic resin polyols, epoxy polyols, butadiene polyols, polyester-polyether polyols, acrylic component-added polyols, acrylic component-dispersed polyols, styrene-added polyols, styrene-dispersed polyols, vinyl-added polyols, vinyl-dispersed polyols, urea-dispersed polyols, and polycarbonate polyols. These may be used alone or in combination. The amounts of these polymeric polyols used are not particularly limited. In view of oil resistance, weatherability, heat resistance, and hydrolysis resistance of the resultant polyurethane polymer, the polymeric polyol is used preferably in an amount of 200 parts by weight or less, and more preferably in an amount of 100 parts by weight or less, based on 100 parts by weight of the vinyl polymer (A) having a mercapto group at each end of the molecular chain.

The method for producing the polyurethane polymer of the present invention is not particularly limited. Various methods commonly used in the art may be employed. For example, various methods described in "Polyurethane Resin Handbook", by Keiji Iwata, Nikkan Kogyo Shinbun, Ltd., 1987 may be used: i.e., a one-shot process in which a vinyl polymer (A), an organic polyisocyanate compound (B), and if necessary, a urethane formation catalyst, a chain extender (C) and a polymeric polyol are mixed and stirred simultaneously to cause a reaction; a prepolymer process in which a diisocyanate (B) and a chain extender (C), such as a short-chain diol, are reacted with each other to form a prepolymer intermediate having isocyanato groups at ends, and then the prepolymer intermediate is reacted with a vinyl polymer (A); a one-part polyurethane process in which the individual components are dissolved in a polar solvent to cause a reaction; a reactive one-part polyurethane process in which the individual components are dissolved in a solvent of low polarity, and a reaction is caused before use; a reactive two-part polyurethane process in which the individual components are formed into a principal component solution and an auxiliary component solution, and the two solutions are mixed to cause a reaction before use; a high solid process in which the amounts of solvents used are minimized or no solvents are used in the reactive two-part polyurethane process; an aqueous two-phase system, etc. In each method described above, by adding the additives which will be described below, to the reaction system, a material containing a polyurethane polymer and the additives is prepared.

In the polyurethane-based material of the present invention, in addition to the polyurethane polymer produced as described above, in order to adjust various physical properties, at least one type of additives that are commonly used in the urethane industry may be compounded as necessary. Examples of additives include, but are not limited to, surfactants, blowing agents, fire retardants, fillers, hydrolysis inhibitors, antioxidants, ultraviolet absorbers, aging resisters, plasticizers, antistatic agents, colorants, tackifiers, silane coupling agents, mildewproofing agents, and release agents.

In the polyurethane elastic fibers of the present invention, in addition to the polyurethane polymer, in order to adjust various physical properties, at least one type of additives that are commonly used in the urethane fiber industry may be compounded as necessary. Examples of additives include, but are not limited to, light stabilizers, dye sticking agents, dyes, pigments, and lubricants.

The polyurethane polymers and polyurethane-based materials containing the polyurethane polymers of the present invention may be used in various forms that are usually used in the art depending on their applications. Examples thereof include slab foams, slabstock foams, molded foams, integral skin foams, press-molded objects, RIM (Reaction Injection Molding), RRIM (Reinforced RIM), one-part spray products, two-part spray products, two-part impregnants, two-part coating materials, cast elastomers, thermoplastic elastomers, millable elastomers, spray elastomers, liquid resins, lacquers, and fibers.

The polyurethane polymers and polyurethane-based materials containing the polyurethane polymers of the present invention are excellent in oil resistance, weatherability, light resistance, heat resistance, hot water resistance, hydrolysis resistance, strength, chlorine resistance, and chemical resistance, and can be produced simply and economically. Consequently, they can be used in various applications. Examples include furniture, bedclothes, seat cushions for automobiles, seat backs for automobiles, other cushions for automobiles, sundry goods, industrial materials, saddles for two-wheeled vehicles, chairs, legless chairs, sofas, mattresses, carpets, packings, beds, cushions for railroad vehicles, cushions for special vehicles, cushions for construction machines, soundproofing materials, buffer materials, dashboards, heat insulators for freezers and refrigerators, heat insulators for liquefied gas storage tanks, heat insulators for tankers, core materials for FRP boards and surfboards, buoyancy materials for lifeboats, target ships, materials which render vessels unsinkable, vessel docks, buoys, floats, railroad containers, heat insulators for tank trucks, heat insulators for railroad vehicles, heat insulators for truck ceilings, heat insulators for tanks, heat insulators for plumbing, tank covers, heat insulators for air conditioners, heat insulators for vending machines, heat insulators for showcases, water heaters, core materials for panels for use in building, siding materials, bathtubs, temperature-controlled rooms, agricultural warehouses, livestock barns, heat insulators for rooftops, anti-condensation materials for houses, heat insulators for roadbeds, vibration dampers, door panels, core materials for chairs, ornamental and industrial art objects, tools for recreation, cooler boxes, water bottles, teaching materials, three-dimensional maps, die materials, jigs, heat-insulating sashes (void filling), core materials for skis (objects produced by RIM), housings, packaging materials, packing materials, various boxes, bay window units, housings for OA equipment, bumpers for automobiles, spray products, aerosol products, pipe covers, synthetic wood-based materials, automobile fasciae, automobile fenders, air spoilers, shoe soles, armrests of furnishings, chair shells, window frames, cupboards, speaker boxes, housings for office equipment, housings for medical equipment, drain pans of air conditioners, screens, cases for telephone switchboards, covers for cable inputting, medicine chests, cabinets for car air conditioners, industrial filters, battery cases, pallets, inner soles, rackets, yacht rudders, boat oars, snow sleds, roller sleds, game machines, musical instruments, air outlets, water outlets, wash stands, dressing tables, mirror frames, wood-carved objects, hangers, kitchen units, sanitary wares, flower pots, rollers, solid tires, casters, idlers for conveyor belts, steel pipe linings, rubber screens, various gears, connection ring liners, pump linings, impellers of pumps, cyclone cones, cyclone liners, small belts for OA equipment, paper feed rollers, squeegees, cleaning blades for copying machines, snowplows, synchronous belts, microcellular elastomers, foams, tubes, hoses, ear tags for identifying animals, bands for wristwatches, nonmetallic tire chains, films, covers, sheets, cable sheaths, bellows, conveyor belts, flexible containers, binders, adhesives, synthetic leather, dipping products, paint, coating materials, sealants, hot-melt adhesives, pressure-sensitive adhesives, ink binders, grout materials, microcapsules, glass fiber sizing agents, polymer cement mortar, resin mortar, recycled foam binders, textile processing aids, fibers, elastic fibers, waterproofing agents, floor materials, athletic materials, sandals, synthetic shoes, children's shoes, bags, schoolchildren's satchels, gloves, hats and caps, balls, clothing materials, caulking compounds, materials for medical use, antithrombotic materials, tubes, catheters, artificial hearts, artificial blood vessels, blood bags, potting materials for artificial kidneys, hemodialysis membranes, and various potting materials.

In particular, when the polyurethane polymers are used as elastic fibers, various types of additives may be incorporated thereinto as necessary, and spinning can be performed by commonly used methods. Examples of methods which may be used include, but are not limited to, a dry spinning method in which a polymer solution is extruded through an orifice into heated airflow, followed by drying to produce fibers; a wet spinning method in which a polymer solution is extruded into a coagulating liquid or reaction liquid to produce fibers; and a melt spinning method in which, without using a solvent, a molten polymer is extruded to produce fibers. Various additives may be used in the spinning step.

The polyurethane elastic fibers of the present invention may be used as bare yarn or as finished yarn by combining bare yarn with other types of fibers. As the finished yarn, any known form may be acceptable, such as single covered yarn, double covered yarn, core-span yarn, ply yarn, or FTY. The types of fibers that can be combined are not particularly limited, and fibers commonly used in the art may be employed. The polyurethane elastic fibers of the present invention may be used in the following applications: various textiles used for leg knits, underwear, pantyhose, two-way tricot materials for swimwear, swimwear, foundations, and outer garments; special textiles for medical clothes/products; knitted goods, textiles for casual use, textiles for sports use, textiles for uniforms, bandages, rib tops for socks, wide stomach bands, narrow tapes, wig bases, and various types of belts.

BEST MODE FOR CARRYING OUT THE INVENTION

While the present invention will be described based on the examples below, it is to be understood that the invention is not limited thereto.

In the description below, the weight-average molecular weight (Mw), number-average molecular weight (Mn), and molecular weight distribution (Mw/Mn) were determined by gel permeation chromatography (GPC) analysis. In the GPC, chloroform was used as an eluent, and a polystyrene gel column was used. The analysis was carried out on the basis of polystyrene.

In order to test light resistance, a molded object was irradiated with carbon arcs at 68° C. for 40 hours. In order to test hot water resistance, a molded object was immersed in boiling water for 12 hours. In order to test chlorine resistance, a molded object was immersed in a 2% sodium hypochlorite aqueous solution at 25° C. for 72 hours. In each test, the molded object was then subjected to a tensile test using a No. 3 dumbbell in accordance with JIS K-6301 at a stretching rate of 200 mm/min, and the retention of strength was evaluated.

With respect to the tensile strength of the fibers, the strength of the resultant filament was measured in accordance with the chemical fiber filament test method (JIS L-1013). With respect to the light resistance of the fibers, the resultant elastic yarn was irradiated with carbon arcs at 68° C. for 40 hours, and then the tensile strength and elongation were evaluated. With respect to the hot water resistance of the fibers, the resultant elastic yarn was immersed in boiling water for 12 hours, and then the tensile strength and elongation were evaluated. With respect to the chlorine resistance of the fibers, the resultant elastic yarn was immersed in a 2% sodium hypochlorite aqueous solution at 25° C. for 72 hours, and then the tensile strength and elongation were evaluated.

EXAMPLE 1

Into a 1 L reactor equipped with an agitator, a thermometer, a nitrogen gas inlet tube, and a reflux condenser tube, was placed 181 g of n-butyl acrylate as a vinyl monomer, 40 mg of 1,1'-azobis(1-cyclohexanecarbonitrile) as a polymerization initiator, 635 mg of a compound represented by formula (3):

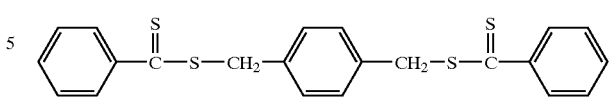

as a thiocarbonylthio group-containing compound, and 300 mL of toluene as a solvent, and the reactor was nitrogen-purged. The reaction solution was heated at 90° C. for 5 hours while being stirred. Toluene was removed from the reaction solution by distillation under reduced pressure. Thereby, 112 g of polymer was produced. $^1$H NMR measurement confirmed that thiocarbonylthio groups were introduced at both ends of poly(n-butyl acrylate), and the introduction rate was 95% on the both-ends basis.

The resultant poly(n-butyl acrylate) having thiocarbonylthio groups at both ends (110 g) was dissolved in 400 mL of toluene, and 30 g of monoethylamine as a processing agent was added thereinto, followed by stirring at 10° C. for 5 hours. The remaining monoethylamine and toluene were removed by distillation under reduced pressure. $^1$H NMR measurement confirmed that the resultant polymer was poly(n-butyl acrylate) having mercapto groups at both ends, and the introduction rate of mercapto groups was 92% on the both-ends basis. GPC analysis confirmed that Mw=75,000, Mn=56,400, and Mw/Mn=1.33.

The resultant poly(n-butyl acrylate) having mercapto groups at both ends (100 parts by weight), 4,4'-diphenylmethane diisocyanate (3.2 parts by weight) as an organic polyisocyanate (B), and 1,4-butanediol (1 part by weight) as a chain extender were mixed. The mixture was melt polymerized using a twin-screw extruder (inlet temperature 80° C., outlet nozzle temperature 190° C.), and elastomeric poly(n-butyl acrylate)-based polyurethane was thereby produced. This polyurethane material showed satisfactory physical properties, i.e., the retention of strength was 98% in the light resistance test; the retention of strength was 95% in the hot water resistance test; and the retention of strength was 97% in the chlorine resistance test.

EXAMPLE 2

Into a 1 L reactor equipped with an agitator, a thermometer, a nitrogen gas inlet tube, and a reflux condenser tube, was placed 181 g of n-butyl acrylate as a vinyl monomer, 40 mg of 1,1'-azobis(1-cyclohexanecarbonitrile) as a polymerization initiator, 11.2 g of a compound represented by formula (3):

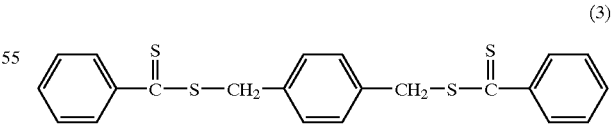

as a thiocarbonylthio group-containing compound, and 300 mL of toluene as a solvent, and the reactor was nitrogen-purged. The reaction solution was heated at 90° C. for 40 hours while being stirred. The reaction solution was sampled, and the production of a polymer was confirmed. $^1$H NMR measurement confirmed that thiocarbonylthio groups were introduced at both ends of poly(n-butyl acrylate), and the introduction rate was 97% on the both-ends basis.

Next, 30 g of diethylamine as a processing agent was added thereinto, followed by stirring at 30° C. for 8 hours. The remaining diethylamine and toluene were removed by distillation under reduced pressure. $^1$H NMR measurement confirmed that the resultant polymer was poly(n-butyl acrylate) having mercapto groups at both ends, and the introduction rate of mercapto groups was 94% on the both-ends basis. GPC analysis confirmed that Mw=6,300, Mn=5,000, and Mw/Mn=1.26.

The resultant poly(n-butyl acrylate) having mercapto groups at both ends (100 g) and hexamethylene diisocyanate (6.5 g) as an organic polyisocyanate (B) were mixed in a nitrogen atmosphere at 80° C. for 3 hours to synthesize poly(n-butyl acrylate) having isocyanato groups at both ends. As a principal component, 100 g of the resultant poly(n-butyl acrylate) having isocyanato groups at both ends was prepared, and as a curing agent, a mixture of 3.5 g of 1,4-butanediol as a chain extender, 10 g of titanium oxide and 13 g of zeolite 3A as fillers, and 5 g of lead octylate as a urethane formation catalyst, and 110 g of calcium carbonate CCR was prepared. A two-part curable polyurethane composition was thereby produced. The principal component and the curing agent were mixed, heated at 60° C. for 10 hours, and formed into a sheet by curing. This polyurethane material showed satisfactory physical properties, i.e., the retention of strength was 104% in the light resistance test; the retention of strength was 105% in the hot water resistance test; and the retention of strength was 101% in the chlorine resistance test.

EXAMPLE 3

Into a 1 L reactor equipped with an agitator, a thermometer, a nitrogen gas inlet tube, a reflux condenser tube, and a dropping funnel, was placed 410 mg of sodium dodecylsulfate as an emulsifier and 400 g of distilled water, and the reactor was nitrogen-purged while the mixture was being stirred at 80° C. Next, 5.4 g of a compound represented by formula (4):

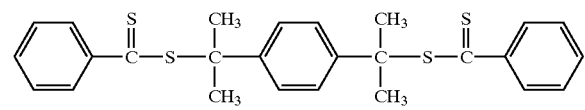

(4)

as a thiocarbonylthio group-containing compound, which was dissolved in 25.6 g of n-butyl acrylate as a vinyl monomer, was added into the reactor, followed by stirring at 80° C. for 20 minutes under nitrogen flow. As a polymerization initiator, 432 mg of 4,4'-azobis(4-cyanovaleric acid) together with 25 g of distilled water was further added thereinto. Stirring was performed at 80° C. for 30 minutes, and then a mixed solution of 51.3 g of n-butyl acrylate and 52.1 g of 2-methoxyethyl acrylate was dripped from the dropping funnel for over 1.5 hours. After dripping was completed, the mixture was stirred at 80° C. for 4 hours, and the emulsion was then cooled to room temperature. A salting-out method was performed, followed by filtration and washing. Thereby, an n-butyl acrylate-2-methoxyethyl acrylate random copolymer was produced. $^1$H NMR analysis confirmed that the introduction rate of thiocarbonylthio groups in the polymer was 95% on the both-ends basis.

The polymer having thiocarbonylthio groups at both ends (80 g) was dissolved in 100 mL of toluene, and 20 g of monoethylamine as a processing agent was added thereinto, followed by stirring at 5° C. for 10 hours. By removing excess monoethylamine and toluene by distillation, an n-butyl acrylate-2-methoxyethyl acrylate random copolymer having mercapto groups at both ends was produced. GPC analysis confirmed that Mw=12,900, Mn=11,300, and Mw/Mn=1.14.

The n-butyl acrylate-2-methoxyethyl acrylate random copolymer having mercapto groups at both ends (50 g) was compounded with 1.84 g of triisocyanate compound B-45 (reaction product between trimethylol propane and tolylene diisocyanate; manufactured by Ipposha Oil Industries Co., Ltd.) as an organic polyisocyanate (B) and 0.05 g of dibutyltin diacetylacetonate U-220 (manufactured by Nitto Kasei Co., Ltd.). The mixture was deaerated under reduced pressure, poured into a slab mold, and cured by heating at 80° C. for 10 hours. The resultant cured polyurethane composition showed satisfactory physical properties, i.e., the retention of strength was 109% in the light resistance test; the retention of strength was 102% in the hot water resistance test; and the retention of strength was 98% in the chlorine resistance test.

EXAMPLE 4

Styrene (45.1 g) as a vinyl monomer and a compound represented by formula (5):

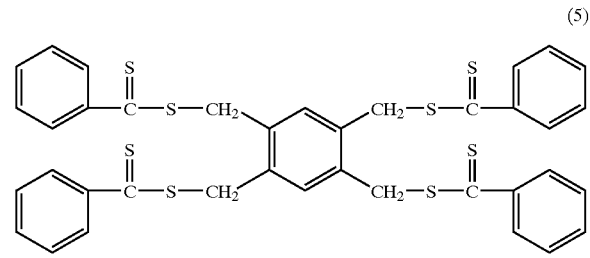

(5)

(273 mg) as a thiocarbonylthio group-containing compound were weighed and placed into a 200 mL reactor equipped with an agitator, a thermometer, a nitrogen gas inlet tube, and a reflux condenser tube, and the reactor was nitrogen-purged. Stirring was performed at 100° C. for 20 hours, and thereby a polymer was produced. The polymer was a star polymer with four arms, and it was confirmed by $^1$H NMR measurement that the polymer had a thiocarbonylthio group at each end. The introduction rate of thiocarbonylthio groups was 78% on the all-ends basis.

Toluene (100 mL) and monomethylamine (3.1 g) as a processing agent were added thereinto, followed by stirring at 0° C. for 15 hours. The solvent was removed by distillation under reduced pressure, and thereby a star polymer with four arms was produced. $^1$H NMR measurement confirmed that the polymer had a mercapto group at each end. The introduction rate of mercapto groups was 72% on the all-ends basis. GPC measurement confirmed that Mw=35, 300, Mn=25,200, and Mw/Mn=1.40.

The resultant star polystyrene having a mercapto group at each end (30 g) was dissolved in 50 mL of toluene, and in a nitrogen atmosphere, 1.0 g of 4,4'-diphenylmethane diisocyanate as an organic polyisocyanate (B) and 3 mg of dibutyltin diacetylacetonate were added thereinto to cause a reaction at 80° C. for 6 hours. Thereby, star polystyrene having an isocyanato group at each end was produced. This polystyrene was formed into a sheet by thermopress-molding at 190° C. The resultant sheet was left to stand in air at room temperature for 2 weeks. As a result, the heat distortion temperature increased by 30% compared to that at the time of molding, and improvement in heat resistance was confirmed.

Comparative Example 1

Into a reactor equipped with an agitator was placed 100 parts by weight of polytetramethylene ether glycol having a number-average molecular weight of 2,000 as a polyol material and 26 parts by weight of 4,4'-diphenylmethane diisocyanate as an organic polyisocyanate (B), and a reaction was caused at 80° C. for 2 hours to synthesize an isocyanato group-terminated prepolymer. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 126 to 4.7, and melt polymerization was performed. With respect to this polyurethane material, the retention of strength was 24% in the light resistance test; the retention of strength was 21% in the hot water resistance test; and the retention of strength was 68% in the chlorine resistance test, all of which were unsatisfactory.

Production Example 1

Into a 1 L reactor equipped with an agitator, a thermometer, a nitrogen gas inlet tube, and a reflux condenser tube, was placed 200 g of n-butyl acrylate as a vinyl monomer, 9.5 g of 1,1'-azobis(cyclohexane-1-carbonitrile) as a polymerization initiator, 32.9 g of a compound represented by formula (3):

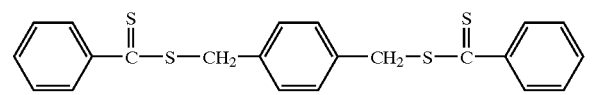

(3)

as a thiocarbonylthio group-containing compound, and 300 mL of toluene as a solvent, and the reactor was nitrogen-purged. The reaction solution was heated at 80° C. for 5 hours while being stirred, and thereby a thiocarbonylthio group-containing polymer was produced. $^1$H NMR measurement confirmed that thiocarbonylthio groups were introduced at both ends of poly(n-butyl acrylate), and the introduction rate was 98% on the both-ends basis.

Into the toluene solution containing 186 g of poly(n-butyl acrylate) having thiocarbonylthio groups at both ends was added 28.9 g of monoethylamine, followed by stirring at 10° C. for 6 hours. The remaining monoethylamine and toluene were removed by distillation under reduced pressure. Methanol (50 mL) was added thereto. The components which dissolved in methanol were removed, and the residue was dried. $^1$H NMR measurement confirmed that the resultant polymer was poly(n-butyl acrylate) having mercapto groups at both ends, and the introduction rate of mercapto groups was 97% on the both-ends basis. GPC analysis confirmed that Mw=2,770, Mn=2,520, and Mw/Mn=1.10.

Production Example 2

Into a 1 L reactor equipped with an agitator, a thermometer, a nitrogen gas inlet tube, and a reflux condenser tube, was placed 200 g of n-butyl acrylate as a vinyl monomer, 4.9 g of 1,1'-azobis(cyclohexane-1-carbonitrile) as a polymerization initiator, 16.43 g of a compound represented by formula (3):

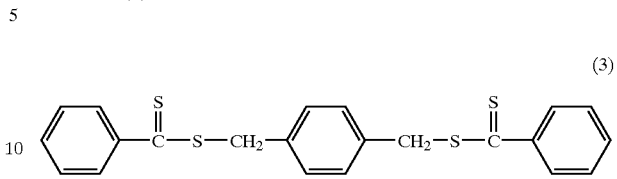

(3)

as a thiocarbonylthio group-containing compound, and 300 mL of toluene as a solvent, and the reactor was nitrogen-purged. The reaction solution was heated at 85° C. for 40 hours while being stirred. Sampling was performed. $^1$H NMR measurement confirmed that thiocarbonylthio groups were introduced at both ends of poly(n-butyl acrylate), and the introduction rate was 97% on the both-ends basis.

Next, 20 g of diethylamine as a processing agent was added thereinto, followed by stirring at 30° C. for 8 hours. The remaining diethylamine was removed by distillation under reduced pressure. Silica gel (10 g) was added into the toluene solution, followed by filtration and drying, and a polymer was thereby produced. $^1$H NMR measurement confirmed that the resultant polymer was poly(n-butyl acrylate) having mercapto groups at both ends, and the introduction rate of mercapto groups was 94% on the both-ends basis. GPC analysis confirmed that Mw=5,800, Mn=5,000, and Mw/Mn=1.16.

Production Example 3

Into a 1 L reactor equipped with an agitator, a thermometer, a nitrogen gas inlet tube, a reflux condenser tube, and a dropping funnel, was placed 410 mg of sodium dodecylsulfate as an emulsifier and 400 g of distilled water, and the reactor was nitrogen-purged while the mixture was being stirred at 80° C. Next, 23.34 g of a compound represented by formula (4):

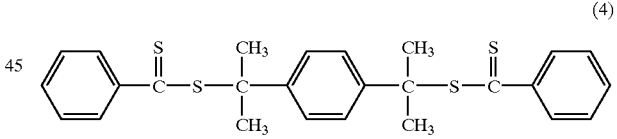

(4)

as a thiocarbonylthio group-containing compound, which was dissolved in 50 g of n-butyl acrylate as a vinyl monomer, was added into the reactor, followed by stirring at 80° C. for 20 minutes under nitrogen flow. As a polymerization initiator, 7.0 g of 4,4'-azobis(4-cyanovaleric acid) together with 25 g of distilled water was further added thereinto. Stirring was performed at 80° C. for 30 minutes, and then a mixed solution of 100 g of n-butyl acrylate and 50 g of 2-methoxyethyl acrylate was dripped from the dropping funnel for over 1.5 hours. After dripping was completed, the mixture was stirred at 80° C. for 4 hours, and the emulsion was then cooled to room temperature. A salting-out method was performed, followed by filtration and washing. Thereby, an n-butyl acrylate-2-methoxyethyl acrylate random copolymer having thiocarbonylthio groups at both ends was produced. $^1$H NMR analysis confirmed that the introduction rate of thiocarbonylthio groups in the polymer was 97% on the both-ends basis.

The polymer having thiocarbonylthio groups at both ends (180 g) was dissolved in 200 mL of toluene, and 20 g of monoethylamine as a processing agent was added thereinto, followed by stirring at 5° C. for 10 hours. By removing excess monoethylamine and toluene by distillation, an n-butyl acrylate-2-methoxyethyl acrylate random copolymer having mercapto groups at both ends was produced. Methanol (50 mL) was added to the resultant polymer. The components which dissolved in methanol were removed, and the residue was dried. Elemental analysis and GPC analysis confirmed that the functionality factor of the mercapto group was 1.89 and that Mw=4,320, Mn=3,970, and Mw/Mn=1.09.

EXAMPLE 5

The poly(n-butyl acrylate) having mercapto groups at both ends (100 parts by weight) which was produced in Production Example 1 and 4,4'-diphenylmethane diisocyanate (21.3 parts by weight) as an organic polyisocyanate were placed into a reactor equipped with an agitator. Stirring was performed in a nitrogen atmosphere at 80° C. for 2 hours, and a poly(n-butyl acrylate) prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 2.97, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1 below.

EXAMPLE 6

The poly(n-butyl acrylate) having mercapto groups at both ends (100 parts by weight) which was produced in Production Example 2 and 4,4'-diphenylmethane diisocyanate (10.0 parts by weight) as an organic polyisocyanate were placed into a reactor equipped with an agitator. Stirring was performed in a nitrogen atmosphere at 80° C. for 2 hours, and a poly(n-butyl acrylate) prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 1.64, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

EXAMPLE 7

The n-butyl acrylate-2-methoxyethyl acrylate random copolymer having mercapto groups at both ends (100 parts by weight) which was produced in Production Example 3 and 4,4'-diphenylmethane diisocyanate (12.5 parts by weight) as an organic polyisocyanate were placed into a reactor equipped with an agitator. Stirring was performed in a nitrogen atmosphere at 80° C. for 2 hours, and an n-butyl acrylate-2-methoxyethyl acrylate prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 2.00, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

EXAMPLE 8

The poly(n-butyl acrylate) having mercapto groups at both ends (100 parts by weight) which was produced in Production Example 1 and hexamethylene diisocyanate (13.5 parts by weight) as an organic polyisocyanate were placed into a reactor equipped with an agitator. Stirring was performed in a nitrogen atmosphere at 80° C. for 5 hours, and a poly(n-butyl acrylate) prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 3.18, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

EXAMPLE 9

The poly(n-butyl acrylate) having mercapto groups at both ends (100 parts by weight) which was produced in Production Example 2 and isophorone diisocyanate (8.9 parts by weight) as an organic polyisocyanate were placed into a reactor equipped with an agitator. Stirring was performed in a nitrogen atmosphere at 80° C. for 2 hours, and a poly(n-butyl acrylate) prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 1.65, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

EXAMPLE 10

Into a reactor equipped with an agitator was placed 4,4'-diphenylmethane diisocyanate (100 parts by weight) as an organic polyisocyanate, 1,4-butanediol (28.8 parts by weight) as a chain extender, and triethylamine (0.01 parts by weight) as a urethane formation catalyst, and stirring was performed in a nitrogen atmosphere at 80° C. for 4 hours. An organic polyisocyanate prepolymer was thereby produced.

Each of the prepolymer and the n-butyl acrylate-2-methoxyethyl acrylate random copolymer having mercapto groups at both ends which was produced in Production Example 3 was heated to 80° C. and fed into a twin-screw extruder (outlet nozzle temperature 200° C.) using a metering pump so that the weight ratio of the prepolymer to the random copolymer was 40.3 to 100, and continuous melt polymerization was performed. At this weight ratio, the ratio between the amount of isocyanato groups in the prepolymer and the amount of mercapto groups in the copolymer was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

EXAMPLE 11

The poly(n-butyl acrylate) having mercapto groups at both ends (50 parts by weight) which was produced in Production Example 1, polycaprolactone having a number-average molecular weight of 2,000 (50 parts by weight), and 4,4'-diphenylmethane diisocyanate (22.5 parts by weight) as an organic polyisocyanate were placed into a reactor equipped with an agitator. Stirring was performed in a nitrogen atmosphere at 80° C. for 2 hours, and a prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 3.31, and continuous melt polymerization was performed. At this weight ratio, the ratio between the amount of isocyanato groups in the prepolymer and the amount of hydroxyl groups in 1,4-butanediol was approximately 1:1. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

Comparative Example 2

Into a reactor equipped with an agitator was placed 100 parts by weight of polytetramethylene ether glycol having a number-average molecular weight of 2,000 and 25.0 parts by weight of 4,4'-diphenylmethane diisocyanate as an organic polyisocyanate. Stirring was performed in a nitrogen atmosphere at 80° C. for 2 hours, and a prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 3.60, and continuous melt polymerization was performed. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

Comparative Example 3

Into a reactor equipped with an agitator was placed 100 parts by weight of hydrogenated polybutadiene having hydroxyl groups at both ends (number-average molecular weight: 2,000) (GI2000 manufactured by Nippon Soda Co., Ltd.) and 25.0 parts by weight of 4,4'-diphenylmethane diisocyanate as an organic polyisocyanate. Stirring was performed in a nitrogen atmosphere at 80° C. for 2 hours, and a prepolymer having isocyanato groups at both ends was produced. Each of the prepolymer and 1,4-butanediol as a chain extender was heated to 80° C. and fed into a twin-screw extruder (outlet nozzle temperature 200° C.) using a metering pump so that the weight ratio of the prepolymer to 1,4-butanediol was 100 to 3.60, and continuous melt polymerization was performed. The resultant polyurethane was extruded in a strand form into water, and the strands were cut into pellets. The pellets were vacuum dried at 90° C. for 24 hours. Using a melt spinning machine provided with a single-screw extruder, 50 denier polyurethane elastic fibers were produced at a spinning temperature of 200° C. and a spinning rate of 100 m/minute.

The tensile strength, light resistance, hot water resistance, and chlorine resistance of the resultant fibers are shown in Table 1.

TABLE 1

| | Tensile properties | | Light resistance | | Hot water resistance | | Chlorine resistance | |
|---|---|---|---|---|---|---|---|---|
| | Strength (g/d) | Elongation (%) | Strength (g/d) | Elongation (%) | Strength (g/d) | Elongation (%) | Strength (g/d) | Elongation (%) |
| Example 5 | 1.52 | 520 | 1.48 | 550 | 1.45 | 505 | 1.54 | 497 |
| (Retention(%)) | — | — | (97.4) | (105.8) | (95.4) | (97.1) | (101.3) | (95.6) |
| Example 6 | 1.34 | 742 | 1.35 | 739 | 1.24 | 702 | 1.31 | 704 |
| (Retention(%)) | — | — | (100.7) | (99.6) | (92.5) | (94.6) | (97.8) | (94.9) |
| Example 7 | 1.51 | 611 | 1.49 | 630 | 1.33 | 573 | 1.29 | 557 |
| (Retention(%)) | — | — | (98.7) | (103.1) | (88.1) | (93.8) | (85.4) | (91.2) |
| Example 8 | 1.33 | 623 | 1.35 | 630 | 1.33 | 617 | 1.31 | 610 |
| (Retention(%)) | — | — | (101.5) | (101.1) | (100.0) | (99.0) | (98.5) | (97.9) |
| Example 9 | 1.27 | 715 | 1.26 | 709 | 1.29 | 700 | 1.23 | 699 |
| (Retention(%)) | — | — | (99.2) | (99.2) | (101.6) | (97.9) | (96.9) | (97.8) |
| Example 10 | 1.48 | 502 | 1.39 | 523 | 1.38 | 533 | 1.41 | 550 |
| (Retention(%)) | — | — | (93.9) | (104.2) | (93.2) | (106.2) | (95.3) | (109.6) |
| Example 11 | 1.61 | 499 | 1.41 | 458 | 1.35 | 447 | 1.33 | 477 |
| (Retention(%)) | — | — | (87.6) | (91.8) | (83.9) | (89.6) | (82.6) | (95.6) |
| Comparative Example 2 | 1.35 | 578 | 0.32 | 49 | 0.28 | 215 | 0.92 | 360 |
| (Retention(%)) | — | — | (23.7) | (8.5) | (20.7) | (37.2) | (68.1) | (62.3) |
| Comparative Example 3 | 0.78 | 615 | 0.71 | 420 | 0.69 | 548 | 0.74 | 492 |
| (Retention(%)) | — | — | (91.0) | (68.3) | (88.5) | (89.1) | (94.9) | (80.0) |

As is evident from Table 1, the polyurethane elastic fibers of the present invention (Examples 5 to 11) have high strength and are excellent in light resistance, hot water resistance, and chlorine resistance. With respect to the polyether-based polyurethane elastic fibers (Comparative Example 2), although the initial strength is high, light resistance, hot water resistance, and chlorine resistance are poor. With respect to the saturated hydrocarbon-based polyurethane elastic fibers (Comparative Example 3), although the retention of strength in each of the light resistance test, the hot water resistance test, and the chlorine resistance test is good, the initial strength is low, thus being impractical.

INDUSTRIAL APPLICABILITY

The polyurethane polymers of the present invention are excellent in oil resistance, weatherability, light resistance, heat resistance, hot water resistance, hydrolysis resistance, strength, chlorine resistance, and chemical resistance. The polymers can be prepared by water-based polymerization, and purification steps can be simplified. Consequently, the polymers can be produced simply and economically. The polyurethane-based materials containing the polyurethane polymers of the present invention can be used in a wide variety of applications and for a wide variety of products because of their excellent characteristics. Furthermore, the elastic fibers containing the polyurethane polymers of the present invention are excellent in weatherability, light resistance, chlorine resistance, hot water resistance, and strength. Consequently, the elastic fibers can be used for various types of textile goods.

The invention claimed is:

1. A polyurethane polymer produced by polymerizing at least two components:
   a vinyl polymer (A) having a mercapto group at each end of the molecular chain, the vinyl polymer being prepared by reversible addition-fragmentation chain transfer polymerization, the molecular weight distribution (Mw/Mn) of the vinyl polymer being 2 or less, the molecular weight distribution being determined by gel permeation chromatography (GPC) analysis; and
   an organic polyisocyanate (B).

2. The polyurethane polymer according to claim 1, wherein the vinyl polymer (A) having the mercapto group at each end of the molecular chain is prepared by a process comprising the steps of:
   radically polymerizing a radically polymerizable vinyl monomer in the presence of a thiocarbonylthio group-containing compound to produce a thiocarbonylthio group-containing polymer, the thiocarbonylthio group-containing compound being represented by general formula (1):

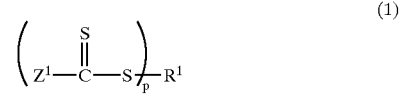

(1)

(wherein $R^1$ is a p-valent organic group of 1 or more carbon atoms which may contain one of nitrogen, oxygen, sulfur, halogen, silicon, phosphorus, and metal atoms, or which may be a polymer; each $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; plural $Z^1$s may be the same or different; and p is an integer of 2 or more); and
   converting the thiocarbonylthio group of the polymer into the mercapto group.

3. The polyurethane polymer according to claim 2, wherein the thiocarbonylthio group-containing compound is a compound represented by general formula (2):

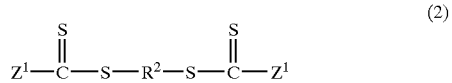

(2)

(wherein $R^2$ is a divalent organic group which may contain one of nitrogen, oxygen, sulfur, halogen, silicon, phosphorus, and metal atoms, or which may be a polymer; each $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; and two $Z^1$s may be the same or different).

4. The polyurethane polymer according to claim 2, wherein the radically polymerizable vinyl monomer is at least one compound selected from the group consisting of styrene, α-methylstyrene, vinyl chloride, methacrylate esters, acrylate esters, acrylonitrile, and vinyl acetate.

5. The polyurethane polymer according to claim 2, wherein the thiocarbonylthio group of the thiocarbonylthio group-containing polymer is converted into the mercapto group by a reaction with a processing agent comprising at least one compound selected from the group consisting of bases and acids.

6. The polyurethane polymer according to claim 2, wherein the thiocarbonylthio group of the thiocarbonylthio group-containing polymer is converted into the mercapto group by a reaction with a processing agent comprising at least one compound selected from the group consisting of ammonia, hydrazine, primary amine compounds, and secondary amine compounds.

7. The polyurethane polymer according to claim 6, wherein the processing agent is at least one compound selected from the group consisting of primary amine compounds with a boiling point of 100° C. or less, secondary amine compounds with a boiling point of 100° C. or less, and hindered amine light stabilizers (HALSs).

8. The polyurethane polymer according to claim 1, wherein the number-average molecular weight of the vinyl polymer (A) having the mercapto group at each end of the molecular chain is in the range of 2,500 to 1,000,000, the number-average molecular weight being determined by gel permeation chromatography (GPC) analysis.

9. The polyurethane polymer according to claim 1, wherein the organic polyisocyanate (B) is an aliphatic polyvalent isocyanate compound.

10. A polyurethane polymer produced by polymerizing at least two components:
   a vinyl polymer (A) having a mercapto group at each end of the molecular chain, the vinyl polymer being prepared by reversible addition-fragmentation chain transfer polymerization; and
   an organic polyisocyanate (B), and further comprising
   a chain extender (C) as a polymer component.

11. The polyurethane polymer according to claim 10, wherein the chain extender (C) is a compound having at least two active hydrogen groups in each molecule, each active hydrogen group being selected from the group consisting of a hydroxyl group and an amino group.

12. A polyurethane-based material comprising the polyurethane polymer according to claim 1.

13. The polyurethane-based material according to claim 12, further comprising at least one additive selected from the group consisting of surfactants, blowing agents, fire retardants, fillers, hydrolysis inhibitors, antioxidants, ultraviolet absorbers, aging resisters, plasticizers, antistatic agents, colorants, tackifiers, silane coupling agents, mildewproofing agents, and release agents.

14. An elastic fiber comprising a polyurethane polymer produced by polymerizing at least two components:
   a vinyl polymer (A) having a mercapto group at each end of the molecular chain, the vinyl polymer being prepared by reversible addition-fragmentation chain transfer polymerization; and
   an organic polyisocyanate (B).

15. The elastic fiber according to claim 14, wherein the vinyl polymer (A) having the mercapto group at each end of the molecular chain has a glass transition temperature of 30° C. or less.

16. The elastic fiber according to claim 14, wherein the vinyl polymer (A) having the mercapto group at each end of the molecular chain is prepared by radically polymerizing 50% to 100% by weight of an acrylate ester monomer and 50% to 0% by weight of at least one monomer selected from the group consisting of styrene, α-methylstyrene, vinyl chloride, methacrylate esters, acrylonitrile, and vinyl acetate.

17. The elastic fiber according to claim 14, further comprising at least one additive selected from the group consisting of antioxidants, ultraviolet absorbers, light stabilizers, dye sticking agents, dyes, pigments, and lubricants.

* * * * *